US008066408B2

(12) United States Patent
Rinko

(10) Patent No.: US 8,066,408 B2
(45) Date of Patent: Nov. 29, 2011

(54) INCOUPLING STRUCTURE FOR LIGHTING APPLICATIONS

(75) Inventor: Kari Rinko, Helsinki (FI)

(73) Assignee: Modilis Holdings LLC, Wilmington, DE (US)

( * ) Notice: Subject to any disclaimer, the term of this patent is extended or adjusted under 35 U.S.C. 154(b) by 506 days.

(21) Appl. No.: 12/003,750

(22) Filed: Dec. 31, 2007

(65) Prior Publication Data

US 2009/0016057 A1    Jan. 15, 2009

Related U.S. Application Data

(60) Provisional application No. 60/877,648, filed on Dec. 29, 2006.

(51) Int. Cl.
*F21S 8/00* (2006.01)
(52) U.S. Cl. ....... 362/268; 362/97.3; 362/555; 362/610; 359/742
(58) Field of Classification Search ................ 362/97.3, 362/268, 360, 555, 610; 359/742
See application file for complete search history.

(56) References Cited

U.S. PATENT DOCUMENTS

| 7,006,306 B2 * | 2/2006 | Falicoff et al. ................ 359/727 |
| 2006/0203518 A1 | 9/2006 | Tseng |
| 2006/0285356 A1 | 12/2006 | Tseng |

FOREIGN PATENT DOCUMENTS

| CN | 1702523 A | 11/2005 |
| CN | 101034182 A | 9/2007 |
| WO | WO9909349 A1 | 2/1999 |

OTHER PUBLICATIONS

The Chinese Office Action mailed on Jan. 26, 2011 for Chinese Patent Application No. 200780051832.4, a counterpart foreign application of U.S. Appl. No. 12/003,750.

* cited by examiner

*Primary Examiner* — Stephen F Husar
(74) *Attorney, Agent, or Firm* — Lee & Hayes, PLLC

(57) ABSTRACT

Light incoupling structures for lighting applications, such as lightguides. The incoupling structures include an optically substantially transparent medium for transporting light emitted by a light source and an optical element including at least one hole in the medium for coupling light together with optional further optical elements. A lighting element includes a light source with related integrated optics.

9 Claims, 18 Drawing Sheets

INCOUPLING STRUCTURE FOR LIGHTING APPLICATIONS

CROSS-REFERENCE TO RELATED APPLICATIONS

This application claims priority to U.S. provisional patent application 60/877,648 filed 29 Dec. 2006.

FIELD OF THE INVENTION

Generally the invention relates to optics. In particular, the invention pertains to incoupling light from a light source to target environment and target entities via optional intermediate elements such as lightguides.

BACKGROUND

Lightguides are waveguides that are typically used for guiding light emitted by light sources in various lighting solutions. The lightguides can be used for display lighting (e.g. back-lighting, front-lighting), keypad, keyboard and/or button lighting, interior lighting, and exterior lighting, among other applications. Conventional lightguides that are considered as thin may have a thickness of about 0.8 to about 1.0 mm and include micro-optical structures for incoupling light thereto and/or outcoupling light therefrom.

FIG. 1 illustrates a side view of an embodiment of a planar lightguide 102 including a plurality of micro-optical structures 106 implemented as surface relief forms on one side of the lightguide 102 for outcoupling 108 light emitted either by a light source 104a or an alternative light source 104b and transported in the lightguide 102 by total reflection. In the example of FIG. 1, light is outcoupled from the lightguide 102 via a top surface opposite to the bottom surface, the latter including the illustrated micro-optical structures 106. The lightguide may include optically transparent polymeric material, such as PMMA (polymethyl methacrylate), for example. The lightguides are often application-specific such that a desired illumination pattern can be precisely obtained. The light source such as a LED (light-emitting diode) may be incoupled via different parts of a lightguide; entity 104a represents an example of a border area/surface or edge-connected light source whereas entity 104b is an instance of top/bottom surface incoupling.

Lightguides may be manufactured according to a number of different processes. Lightguide layer production can be completed by means of continuous roll replication, or "roll-to-roll" replication, among other options. By applying this manufacturing method bulk material, such as optically transparent plastic film, may be utilized in surface relief replication. Different roll-to-roll methods are prior known and feasible for manufacturing micro-optic surface relief forms (e.g. structures), either refractive or diffractive, for many different applications. Several roll-to-roll methods are available, such as the ones by Reflexite, Avery Dennison, 3M, Epigem, Rolltronics, Polymicro, Printo project, among others. Other suitable production methods may include continuous or discrete casting methods (UV or thermal curing), compression molding, injection molding, continuous or discrete embossing, such as hard embossing, soft embossing and UV embossing, among others. Melt film can also be used.

Now referring to FIG. 2, a surface view of a planar, elongated lightguide 202 is shown with a substantially point-like source of light 204 configured such that the light emitted therefrom is incoupled to the lightguide 202 via a border surface thereof. A line 206 with an arrow indicating the major direction of propagating light has been depicted to illustrate inclusion of an incoupling structure for controlling the incoupling between the light source 204 and the lightguide 202.

FIG. 3a illustrates one example of a lightguide 302 including an incoupling structure 306 consisting of a number of surface relief forms, such as a grating structure, located directly at one end surface of the lightguide 302 in front of the LED 304.

FIG. 3b illustrates an example of a lightguide 302 including a separate incoupling structure 306 between the lightguide 302 and the LED 304.

Notwithstanding the above and various other existing solutions for incoupling light into a lightguide or some other target area few drawbacks have remained therein concerning the characteristics of the coupled light. Either the arrangements have been rather bulky and thus unsuitable for microscale applications wherein size restrictions for positioning the lightguide, light source and associated elements are considerable, or the results have functionally turned out only partially fulfilling due to unacceptably irregular illumination pattern obtained on a predetermined outcoupling surface, or to weak incoupling efficiency, for example.

SUMMARY OF THE INVENTION

An objective of embodiments of the present invention includes alleviating the aforesaid drawbacks evident in the prior art arrangements. This objective may be achieved with embodiments of incoupling structures in accordance with the present invention.

According to one aspect of the present invention, a light incoupling structure for lighting applications, such as lightguides, includes optically substantially transparent medium for transporting light emitted by a light source, a first optical element arranged in the medium for spreading light initially propa-gating in the medium between a predetermined input and output surface thereof, towards the sides of the medium relative to the initial propagation direction between the input and output surfaces, the first optical element defining one or more holes, such as blind holes or through holes, in the medium with one or more substantially 'x' or 'v'-type sharp-edged or rounded shapes, a second optical element including a plurality of micro-optic surface relief forms arranged relative to the medium for redirecting the light propagated through the medium, wherein the first optical element and the second optical element are configured to co-operate with the medium so as to increase the uniformity and collimation of the propagated light.

The incoupling structure may be functionally and optionally also physically separate or at least separable entity from a target entity such as a lightguide. The second optical element may be formed on the output surface of the optically substantially transparent medium such that an increase in the uniformity and collimation of light is already achieved at the output surface, for example. In another embodiment, the second or further optical element may be physically formed from and/or on a surface of the target entity configured to face the output surface of the medium. In case the incoupling structure is physically integrated with the target entity, the second optical element may define a boundary surface between the input structure and the (rest of the) target entity such as a lightguide.

In another aspect of the present invention, a light incoupling structure for lighting applications includes optically substantially transparent medium for transporting light emitted by a light source, a first optical element arranged in the medium, wherein the first optical element defines at least part of a substantially cone-shaped or truncated cone-shaped blind or through hole in the medium, wherein the first optical element is configured to redirect light via the boundary region between the medium and the hole into the medium to propagate therein, preferably by total internal reflection.

The above incoupling structure may also include a second and optionally further optically functional elements located on a predetermined surface such as a predetermined output surface of the medium of the incoupling structure, for example.

In various embodiments of the present invention optical elements may be formed by selecting e.g. the dimensions and material of the medium appropriately, and/or by arranging e.g. surface relief forms thereto such that the propagating light is configured to act in a predetermined, controlled manner upon interaction with the associated boundary regions, for example.

Yet concerning various embodiments, the hole(s) may be filled with air or some other preferred gas, or by feasible solid, elastic or even gel or liquid medium. The refractive index of the medium and thus the medium itself may be selected application-specifically and optionally in connection with defining optical element dimensions and positioning such that a desired overall optical functionality is thereby obtained.

The shape of the medium material may be predetermined together with the first and optionally second optical elements so as to co-operatively increase the uniformity, collimation and incoupling efficiency of incoupled light. The material of the medium may be the same with the material of the target entity. Alternatively, different materials may be used. The medium may substantially have a cross-sectional shape of a hexagon or quadrilateral, for example. In hexagonal case one preferred form may be considered as an aggregate of an isosceles trapezoid joined from the longer parallel side with a rectangle, for example. The medium may be symmetrically aligned relative to the light source and/or the target entity. For example, the input surface of the medium may be symmetrically positioned on the optical axis of the light source. Likewise, the output surface may be symmetrically positioned relative to the target entity.

The holes defined by the optical elements and having a planar/cross-sectional form of an 'x' or 'v', for example, may be aligned symmetrically in the medium relative to the light source and light incoupled therefrom, e.g. relative to the optical axis of the light source.

In certain embodiments the optically transparent medium may be planar, and e.g. at least the optical output surface may be adapted to match the corresponding (input) dimensions of a target entity such as a lightguide. In other embodiments the medium may be substantially of different size than the target entity, e.g. bigger at least in one dimension, such that a single incoupling structure may be configured to funnel light into multiple, either similar or different, target entities, for example. Despite of the predetermined output surfaces, some light may leak outside the medium also through other areas depending on each particular application.

In some embodiments of the present invention a light source, such as a LED, may be integrated with the light incoupling structure, and the aggregate entity, i.e. lighting element, may be optionally further integrated with a target entity such as a lightguide. The incoupling structure in accordance with embodiments of the present invention may form at least part of the light source optics, e.g. LED optics. In other embodiments the light incoupling structure is integrated with the target entity. The incoupling structure may be still considered as at least functionally separate element despite of physical integration with other components.

The utility of embodiments of present invention may arise from a plurality of issues depending on each scenario. The incoupling structure may generally function as a homogenizer of light distribution. The incoupling structure may especially be configured so as to efficiently collimate and/or uniform the light provided to the target entity such as a lightguide. Alternatively, the incoupling structure may be utilized to couple light directly into target environment, e.g. surrounding space, without further entities such as lightguides in between.

Many solutions typically require only a modest space between the light source and the target entity and in many embodiments one or more elements may be integrated together, which enables producing small-sized optical products with high level of integration but still top quality optics. The achieved incoupling efficiency may be superior to utilization of mere diffractive incoupling gratings, for example. Further, the incoupling structures in accordance with the embodiments of the present invention may be manufactured easily by injection molding or drilling the required shapes to the medium afterwards.

The micro-optic surface relief structures in accordance with some embodiments of the present invention may include diffractive and/or refractive surface relief forms such as grating grooves, recesses, or protrusions with different cross-sectional shapes, e.g. blazed, trapezoidal, sinusoidal, parallelogrammal, binary, etc.

The term 'x' refers, in the context of the present invention, to a shape that may be considered to be established from two elongated entities, such as lines crossing each other and thus forming a common central portion with four protrusions; the angle between the two entities may, however, vary and differ from the common 90° as to be reviewed hereinafter. The crossing point divides each elongated entity into two parts that may be of different length.

Various embodiments of the present invention are disclosed in the attached dependent claims.

BRIEF DESCRIPTION OF THE RELATED DRAWINGS

Figure 7A:
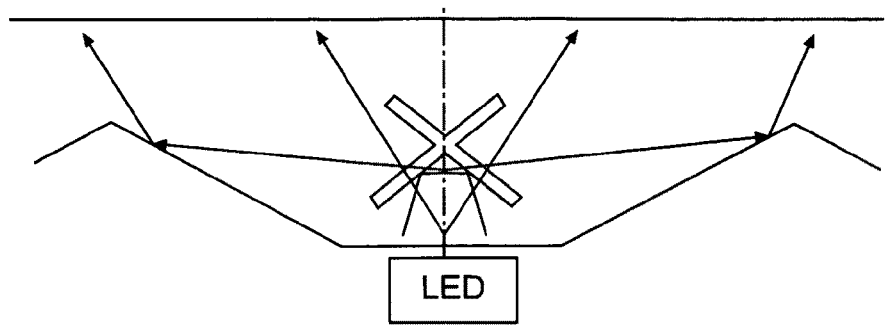
FIG. 7a illustrates an embodiment in which multiple light sources applied.
Figure 7B:
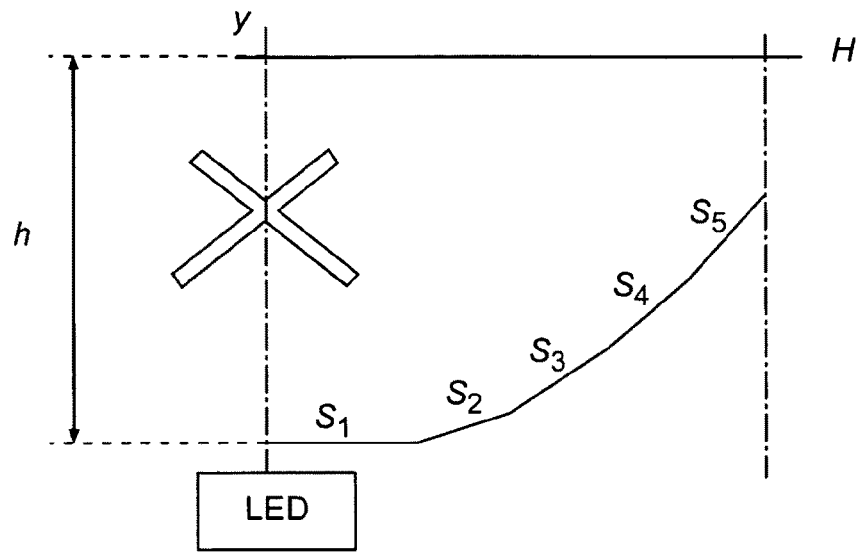
FIG. 7b illustrates an embodiment of the incoupling structure medium optimization by dividing the edge thereof into multiple segments.
Figure 7C:
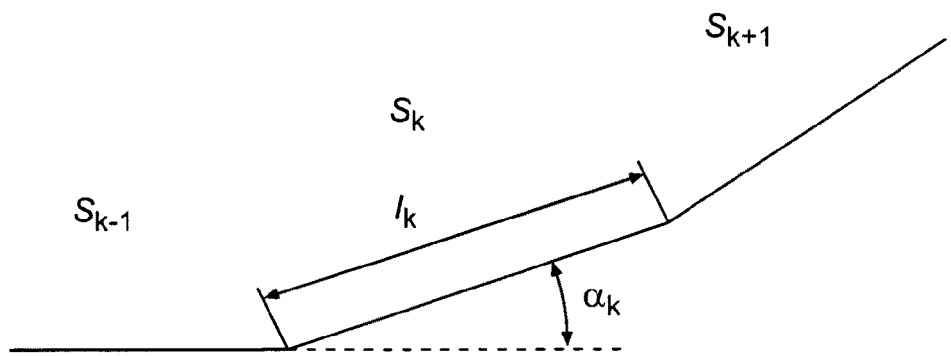

FIG. 7c further illustrates one segment.

Figure 7D:
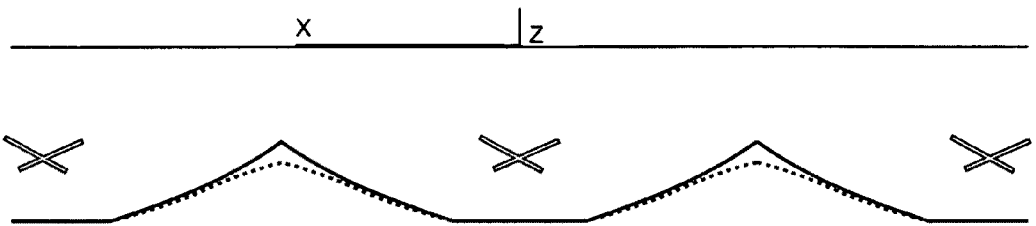

FIG. 7d illustrates one embodiment of an incoupling structure medium optimized for multiple light sources.

Figure 7E:
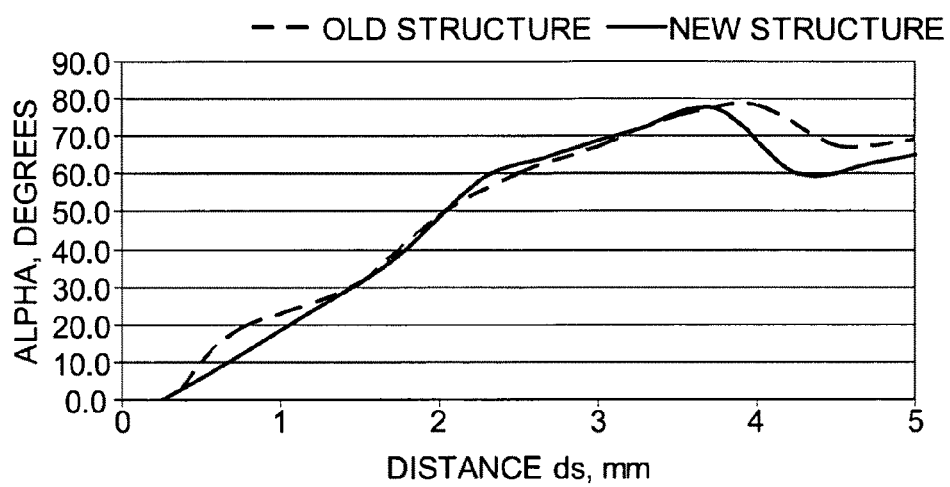

FIG. 7e illustrates relief inclination angle dependencies.

Figure 7F:
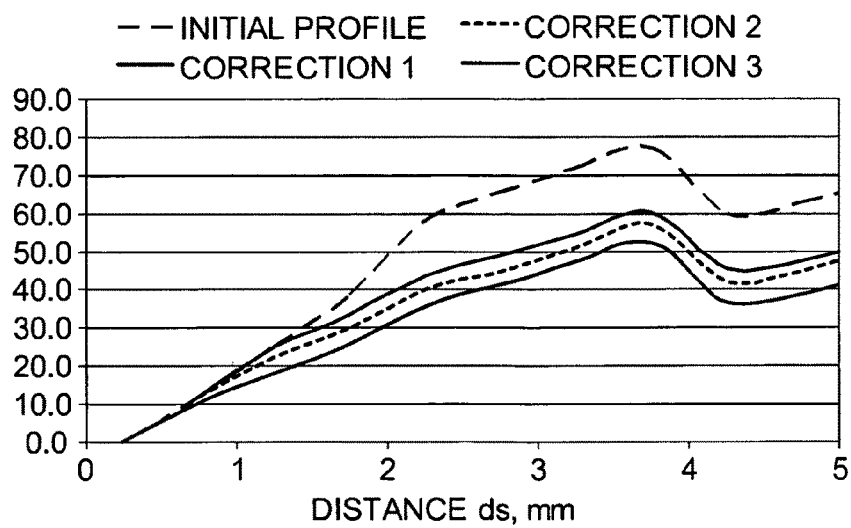

FIG. 7f illustrates relief inclination angles with correction applied.

Figure 7G:
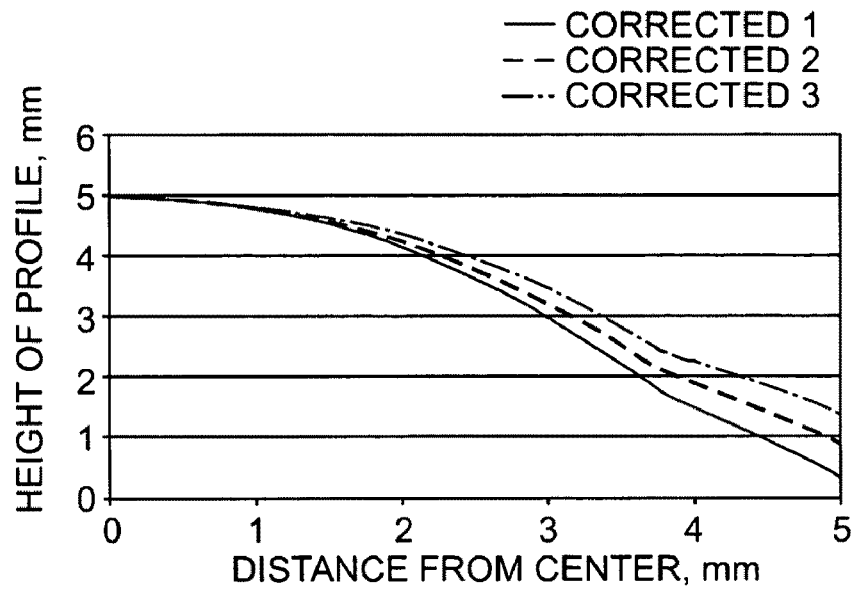

FIG. 7g illustrates continuous surface relief structures.

Figure 8:
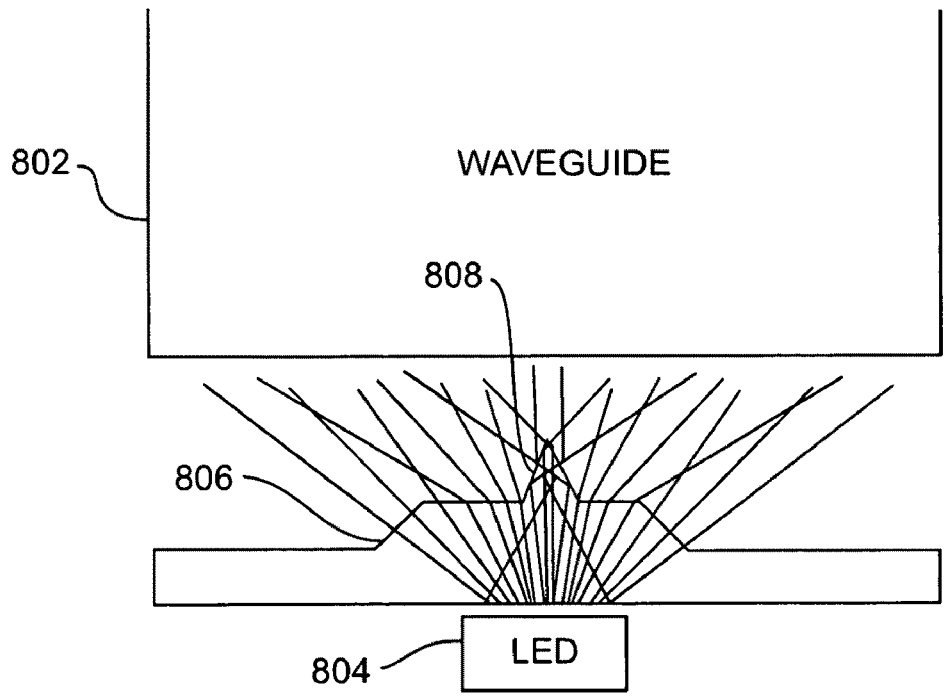

FIG. 8 illustrates a further embodiment of a light incoupling structure.

Figure 9:
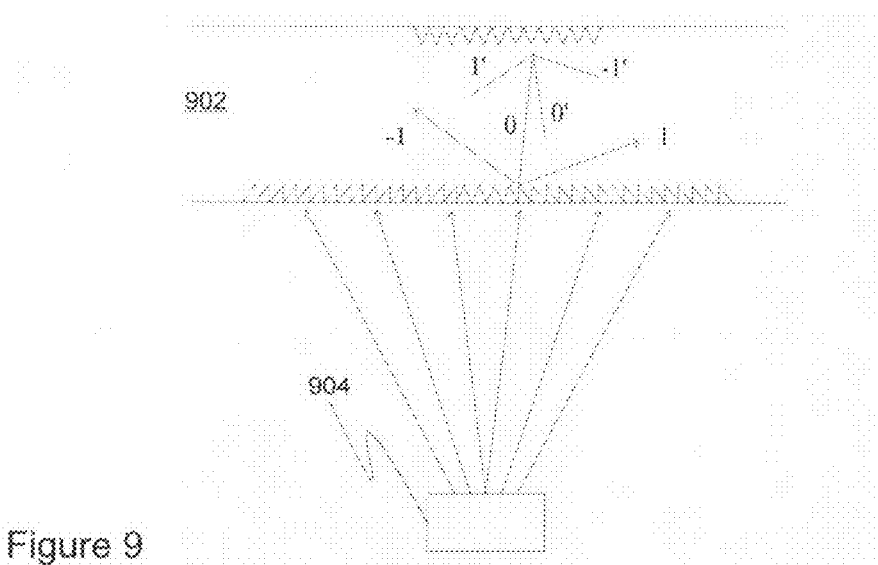

FIG. 9 illustrates still a further embodiment of a light incoupling structure.

Figure 10A:
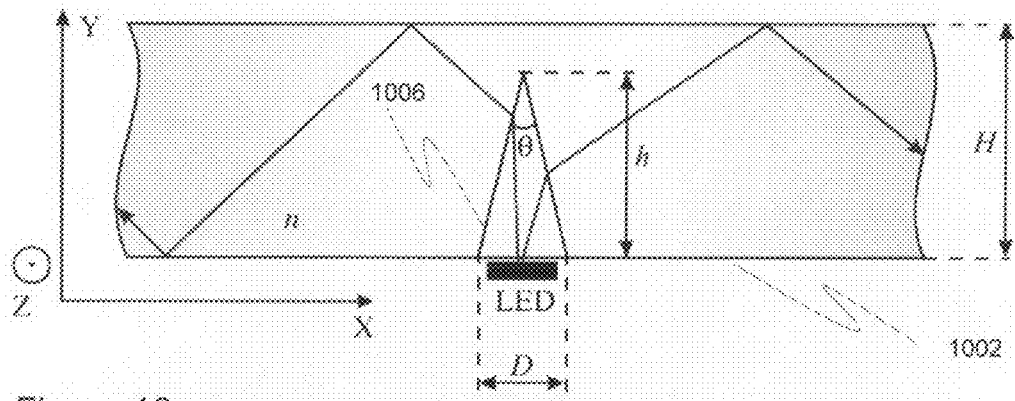

FIG. 10a illustrates an embodiment of a light incoupling structure including a cone-shaped hole.

Figure 10B:
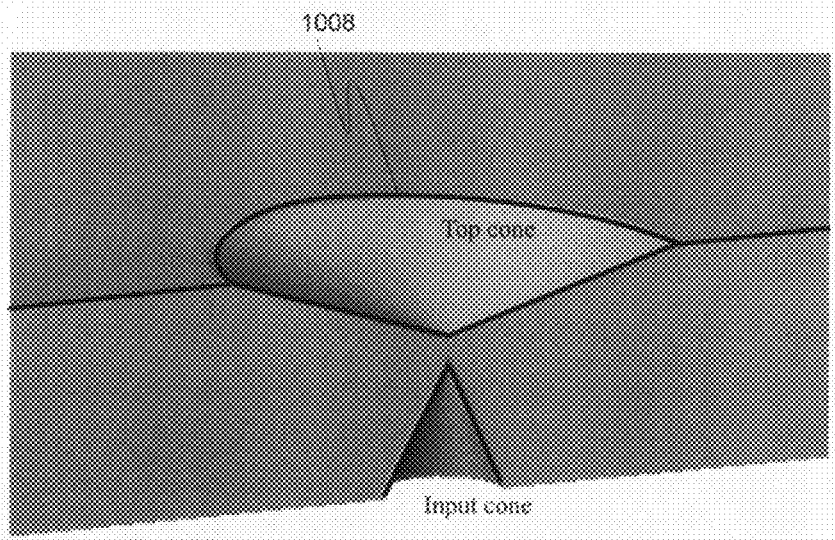

FIG. 10b illustrates another embodiment with a cone-shaped incoupling hole and a supporting top cone.

Figure 11A:
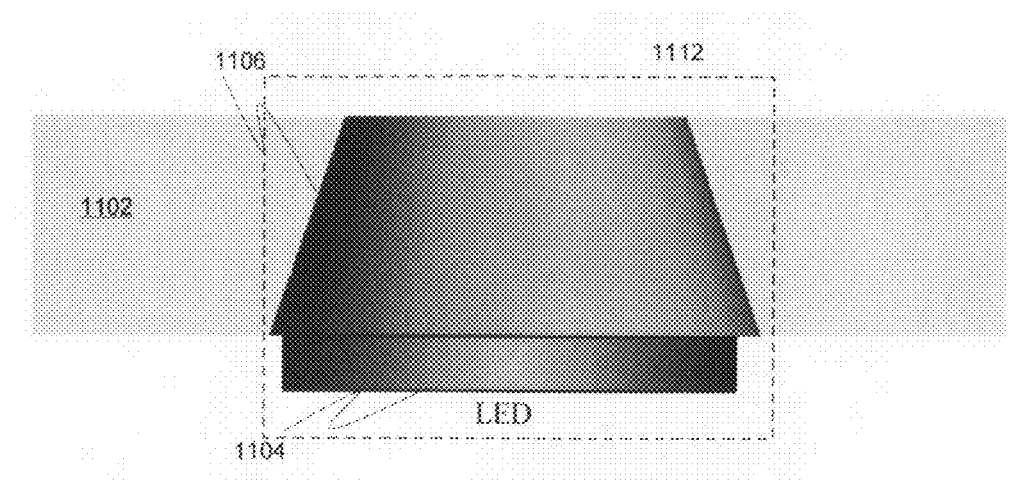

FIG. 11a illustrates a further embodiment with a truncated cone-shaped incoupling hole arrangement.

Figure 11B:
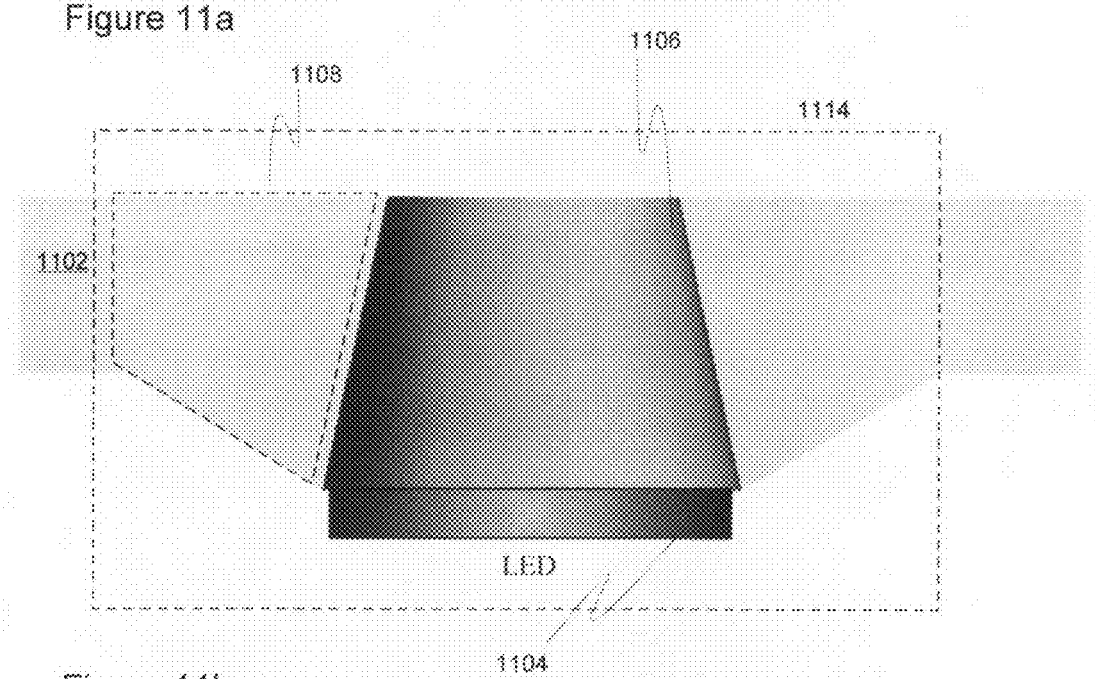

FIG. 11b illustrates still a further embodiment with a truncated cone-shaped incoupling hole.

Figure 11C:
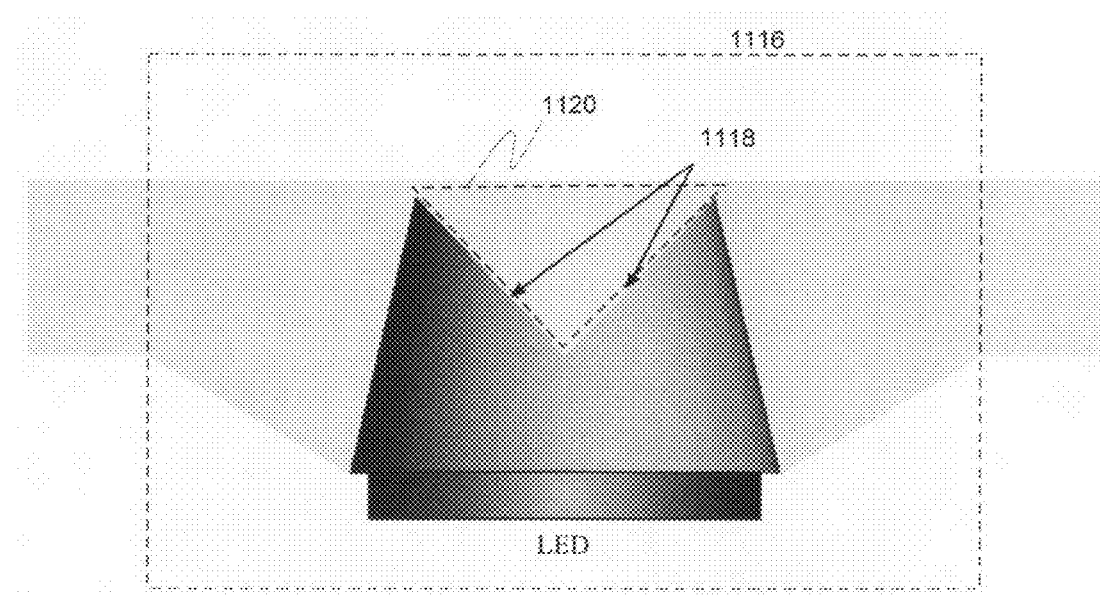

FIG. 11c illustrates an embodiment in which a truncated hole-shape incoupling element is provided with a reflective top.

Figure 11D:
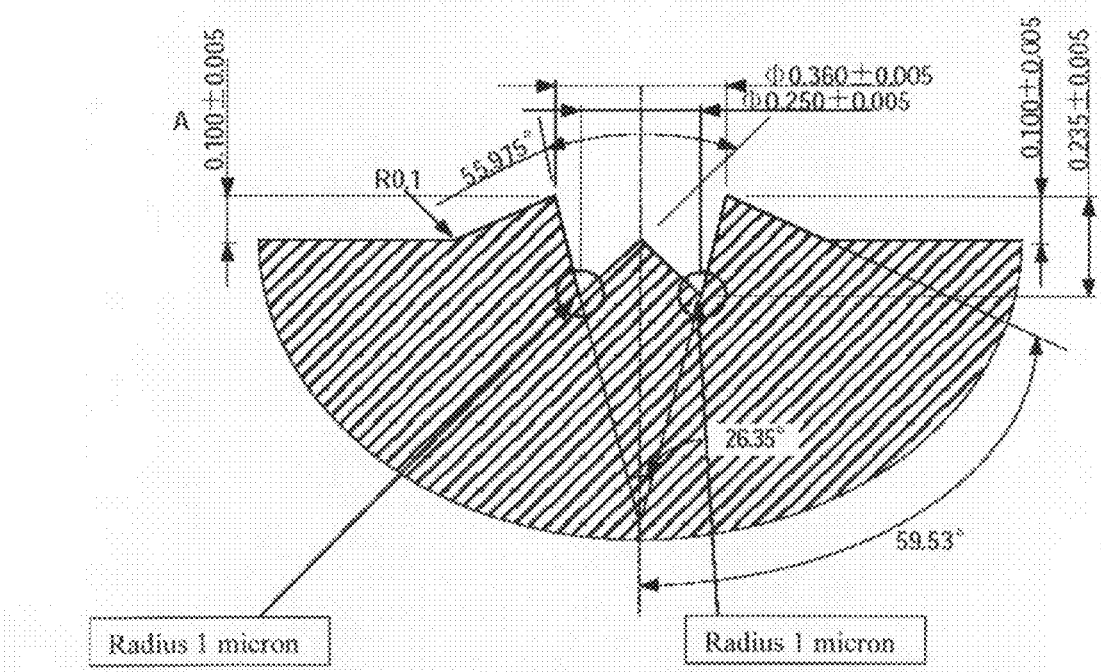

FIG. 11d illustrates applicable, however only exemplary, dimensions for an incoupling arrangement of FIG. 11c.

Figure 12A:
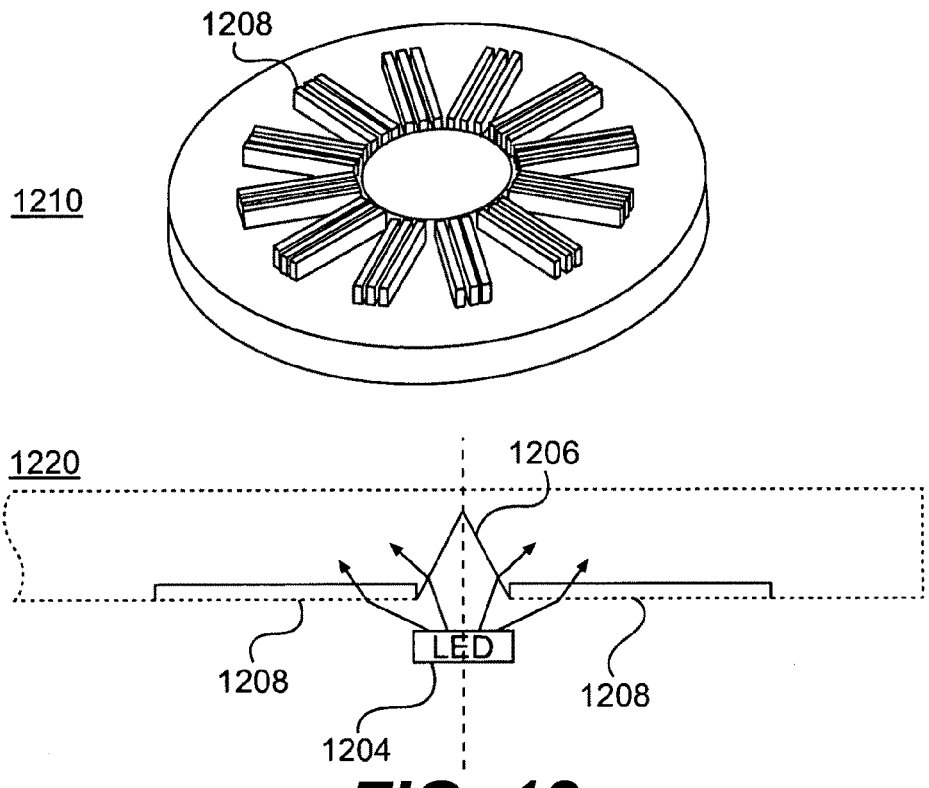

FIG. 12a illustrates one embodiment of a hybrid incoupling structure including an azimuthal grating and an incoupling cone.

Figure 12B:
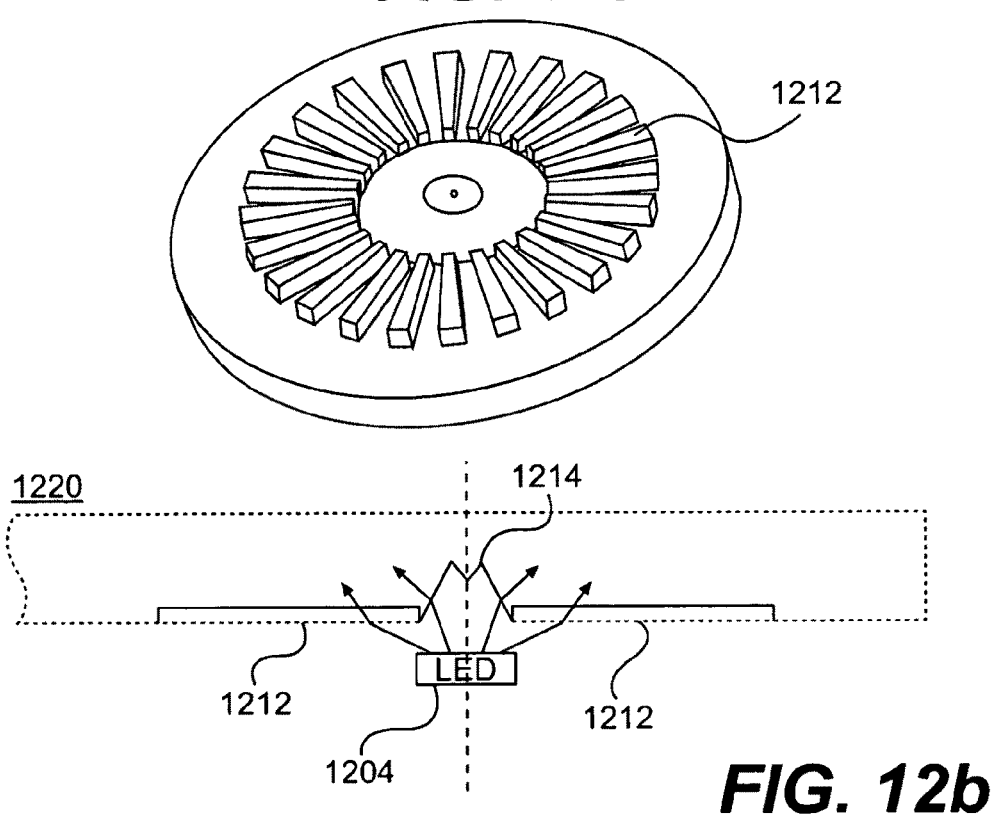

FIG. 12b illustrates another embodiment of a hybrid incoupling structure with azimuthal grating and an incoupling cone.

Figure 12C:
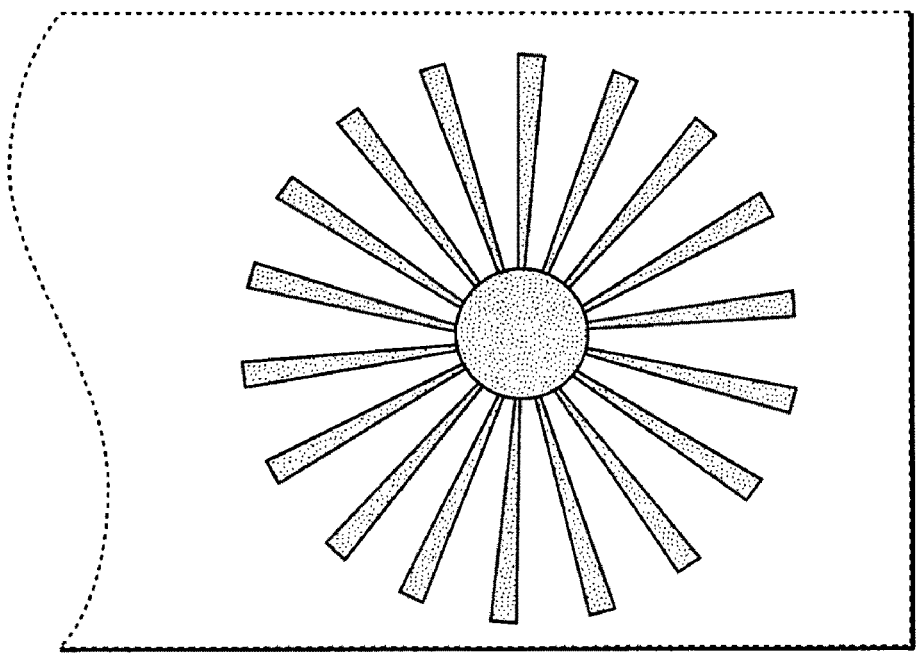

FIG. 12c illustrates a further embodiment of an azimuthally symmetrical grating.

Figure 13A:
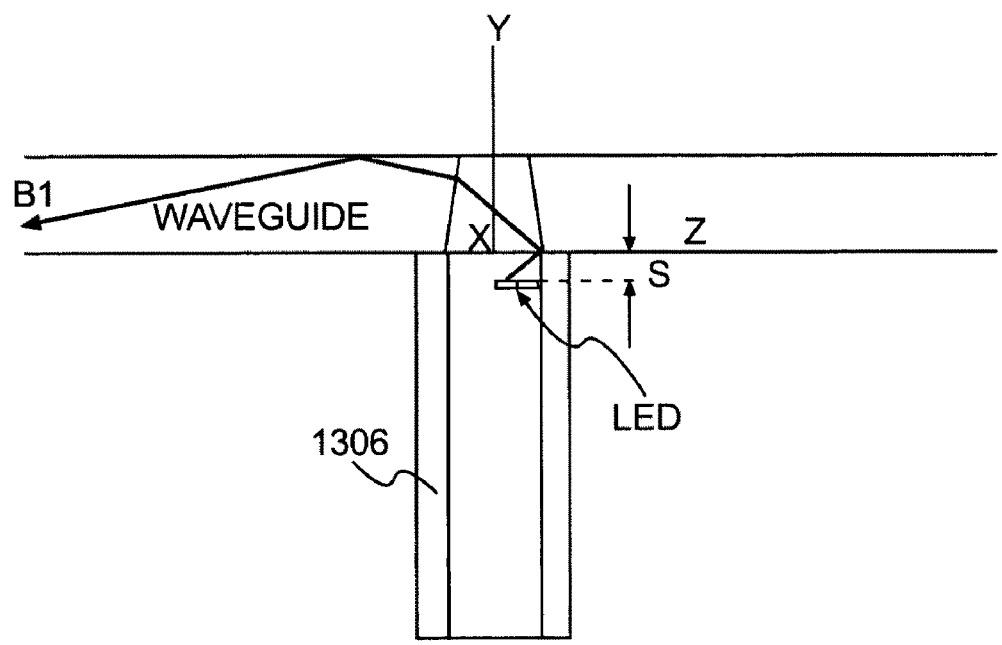

FIG. 13a illustrates an embodiment of an incoupling structure including a cylinder shape for white balance correction.

Figure 13B:
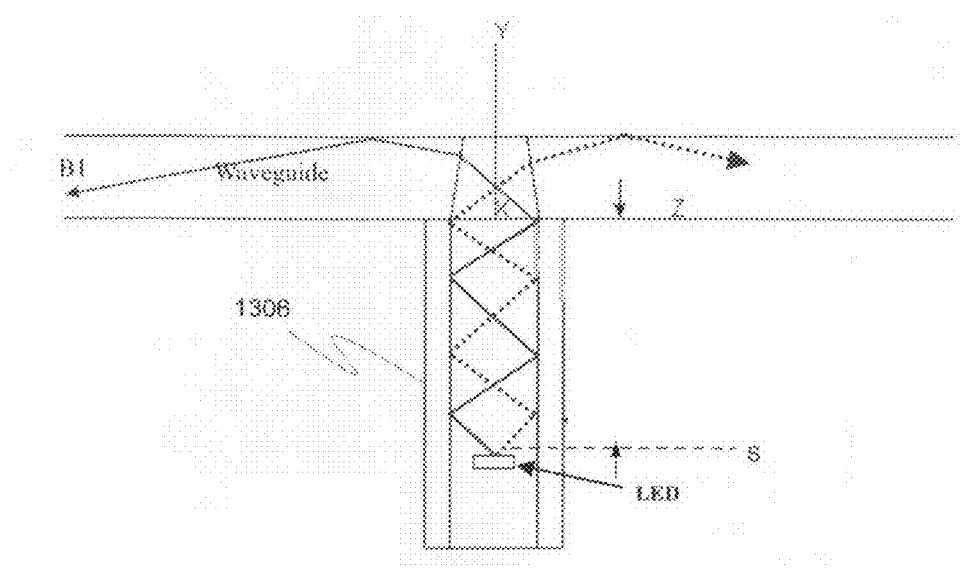

FIG. 13b illustrates alternative set-up of the embodiment with a cylindrical element.

Figure 14:
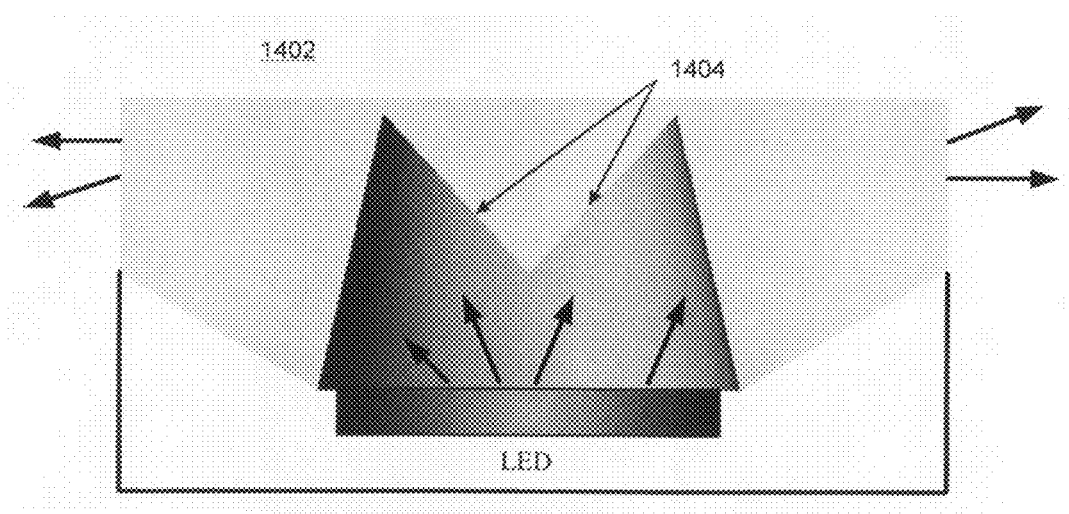

FIG. 14 illustrates an embodiment of a lighting element incorporating a light source and related optics.

DETAILED DESCRIPTION OF THE EMBODIMENTS

Generally, a light source may be connected directly to a lightguide element and thus introduce light thereto without additional means. Alternatively, the lightguide may be arranged with one or more incoupling structures. The incoupling structure may include a wedge including specular reflectors on at least one of a top and bottom surface, an elliptical light pipe, a focusing lens and/or a bundle of split optic fibers. On the other hand, the light source and the incoupling structure may form a unitary structure. When the lightguide element includes multiple lightguide layers, incoupling may vary among the layers.

Figure 1:
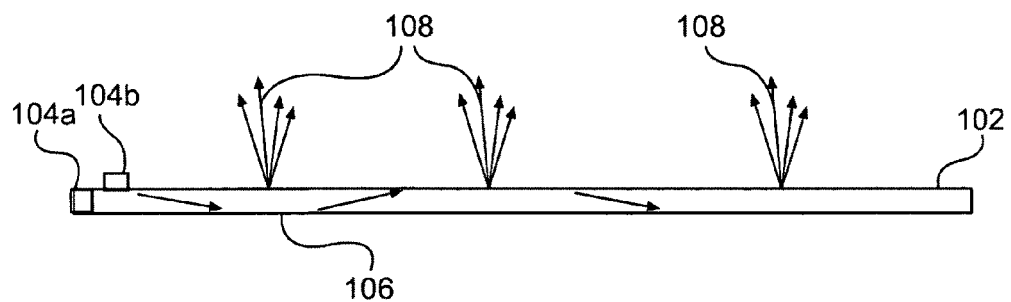
FIG. 1 illustrates one example of a prior art lightguide with a light source.
Figure 2:
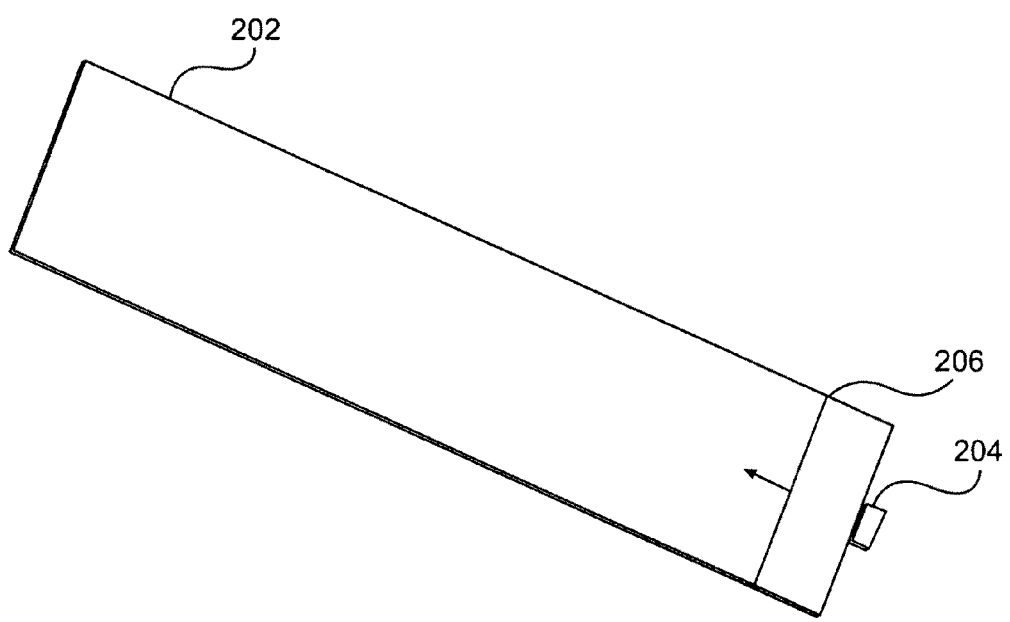
FIG. 2 illustrates a rotated top view of a prior art lightguide with a light source.
Figure 3A:
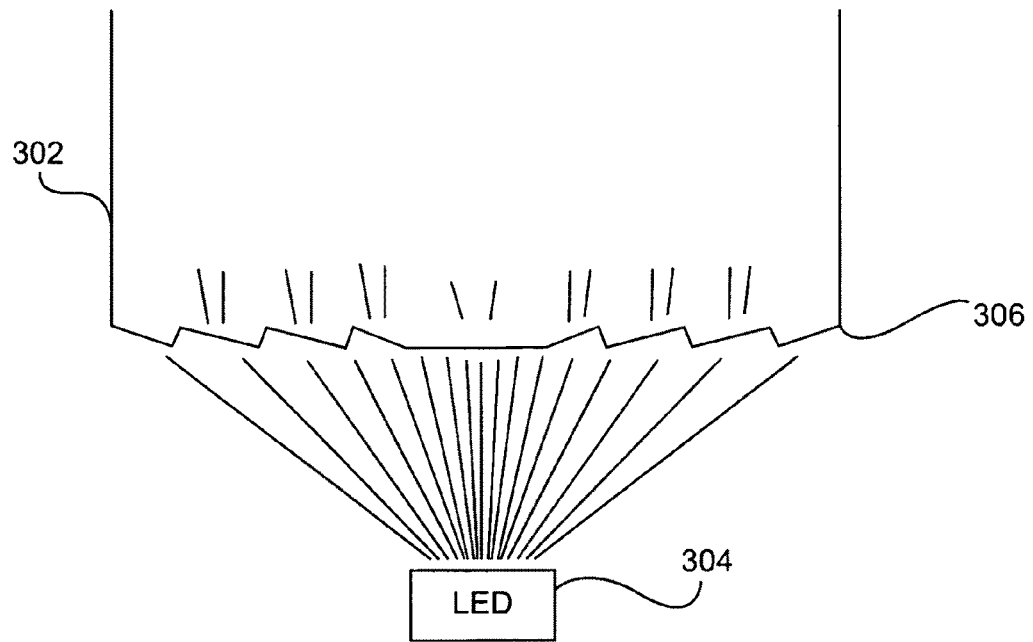
FIG. 3a illustrates an example of a lightguide, a related light incoupling structure, and a light source.
Figure 3B:
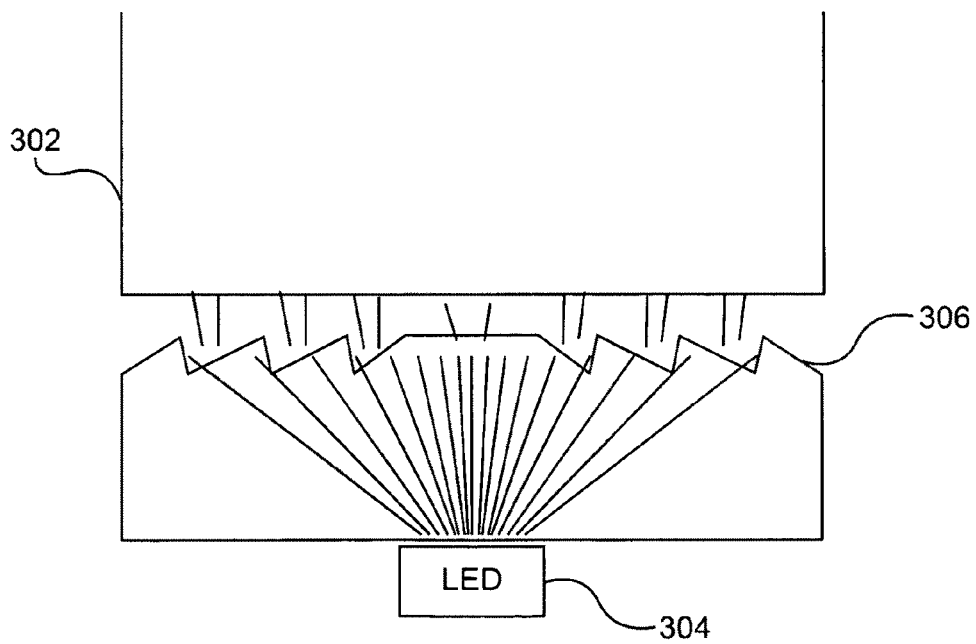
FIG. 3b illustrates another example of a lightguide, a related light incoupling structure, and a light source.
Figure 4A:
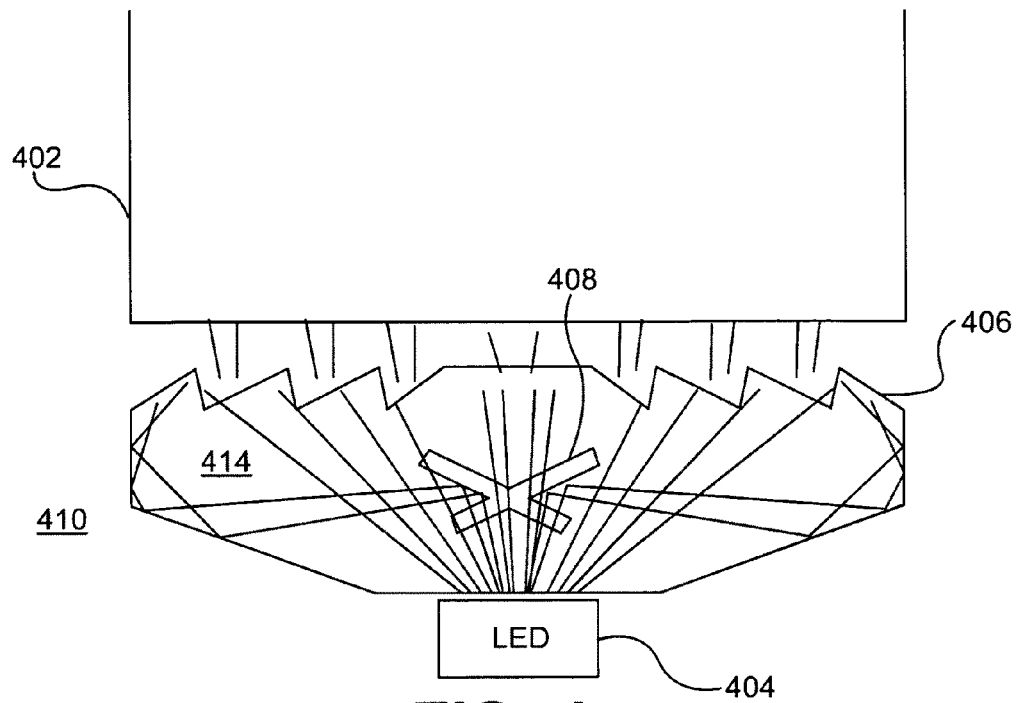
FIG. 4a illustrates an embodiment of an incoupling structure in accordance with the pre-sent invention.

FIG. 4a illustrates one embodiment of the incoupling structure 410 in accordance with the present invention. The utilized light source 404 may include a LED, such as NICHIA NSSW020BT, for example. The target entity is in this case a lightguide 402, which may be a substantially planar lightguide and have a thickness of e.g. about 0.5 mm and illumination area width of e.g. about 10 mm. Length of the collimating incoupling structure 410 is preferably small, e.g. about 3.5 mm or less. Material of the structure medium 414 and/or target entity such as lightguide 402 may include e.g. PMMA with refraction index (n) of about 1.493.

A surface relief structure 406 such as a plurality of surface relief forms is utilized as a collimation structure to improve, i.e. typically lower, the angular intensity distribution in the lightguide 402. The exploited surface relief structure 406 may include a Fresnel profile, for example. Desirable angular intensity may be specified via a maximum full width—half maximum (FWHM) value in degrees, for example.

Uniformity of light conveyed to the lightguide 402 may be improved by defining one or more predetermined refractive and/or diffractive holes, or 'air scratches' 408, on the medium surface 410 so as to spread at least part of the rays arriving at the boundary between the medium and the hole more evenly inside the medium 410. In the illustrated embodiment the hole 408 is arranged symmetrically on the structure 410 relative to the light source 404 (axis of symmetry) and the medium 414 dimensions, i.e. it is centered concerning the both two aspects.

Advantageously, at least a portion of light emitted by the light source 404 is deflected upon impact at the hole boundary 408 from the center region of the incoupling structure 410 towards the side(s) so as to increase the uniformity of light over a predetermined surface of the target lightguide 402 whereto the light is directed from the structure 410 via the surface relief structure 406 on the predetermined exit surface. The optical elements 406, 408 and medium 414 parameters may be jointly optimized for each application, and the optimization may be performed either considering the incoupling structure alone or together with the connected target entity such as the lightguide 402.

Portion of the light that is emitted by the light source 404 towards the lightguide 402 may also propagate substantially straight through the hole(s) 408 of the incoupling structure 410. The hole(s) 408 may be blind hole(s) and/or through hole(s) and define one or more contour lines on the incoupling structure 410, for example. The hole material may include air or some other gas, or selected solid or elastic material with preferred characteristics such as predetermined refractive index, for example. The contour(s) as created by the hole(s) 408 may define one or more substantially 'crossing lines' or 'x'-like shapes in the medium 414 of the incoupling structure 410. The line-shapes crossing each other may be straight or slightly wavy. The central portion of the shape may be larger than a mere combination of superposition of two differently aligned lines. The (surface) plane of the incoupling structure 410 may be parallel to the plane of the lightguide 402.

The incoupling structure 410 may be physically separate (shown in the figure via a gap between the structure 410 and the lightguide 402) or at least separable from the lightguide 402 and/or light source 404, or be e.g. seamlessly integrated therewith by injection molding, for example. Nevertheless, the incoupling structure 410 may be considered, by its function, at least a logically substantially separable, independent entity. Thus, in one embodiment the surface relief forms logically belonging to the incoupling structure may be additionally or alternatively physically formed on the input surface of the target entity, e.g. the lightguide 402.

In order to review the performance of the embodiment, light uniformity over the waveguide Uw, uniformity over the frontal side of the waveguide Uf at about 3.5 mm and about 5 mm distance from the LED 404 and incoupling efficiency E were determined in the exemplary configuration. E was found to be about 76%, Uf (3.5) about 84%, Uf (5) about 86% and Uw over 93%. Thus, the construction was generally found rather satisfying as to the resulting uniformity characteristics and it is thus feasible in backlight applications with less stringent requirements on the FWHM value, for example.

Figure 4B:
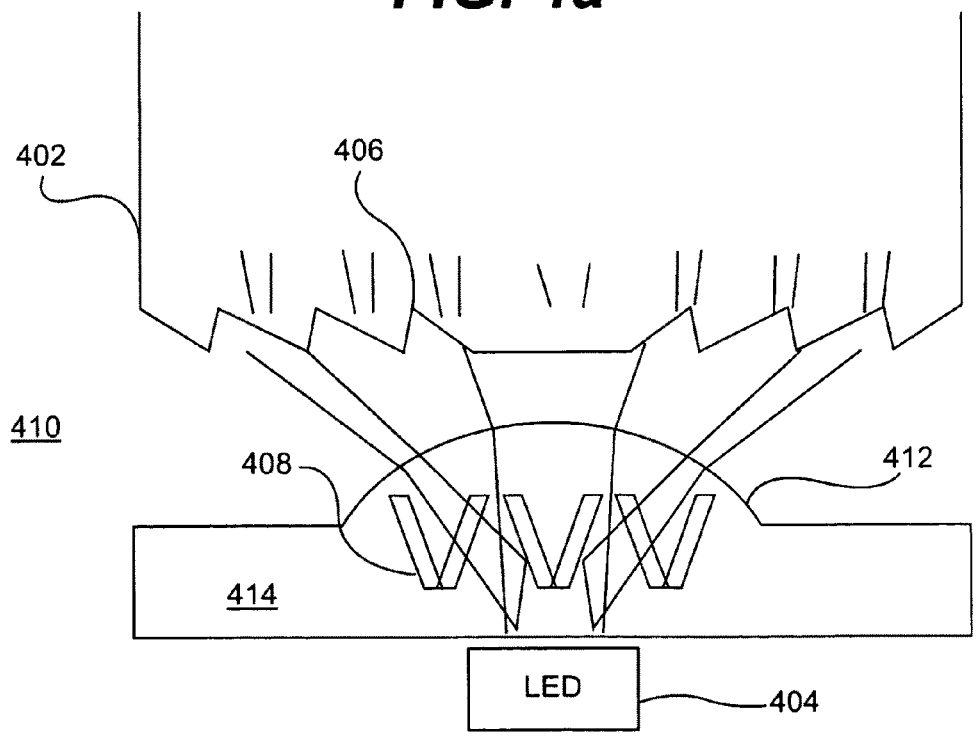
FIG. 4b illustrates another embodiment of an incoupling structure in accordance with the present invention.

FIG. 4b illustrates a plan view of another embodiment of the present invention, wherein the incoupling structure 410 in this embodiment includes a collimating surface relief structure 406 that is physically located at the lightguide 402 end, or 'input', surface. The incoupling medium 414 includes one or more, e.g. three as shown, substantially 'v'-shaped holes 408 to improve the resulting uniformity according to the principles already set forth hereinbefore. Further, a lens 412 such as a (plano-) convex lens has been added to co-operate with the holes for spreading the light and increasing the uniformity. The v-shaped holes may be sharp-edged or curved/rounded, e.g. more 'u' or in case of multiple adjacent shapes, 'w'-like, or also wavy in nature.

Figure 5:
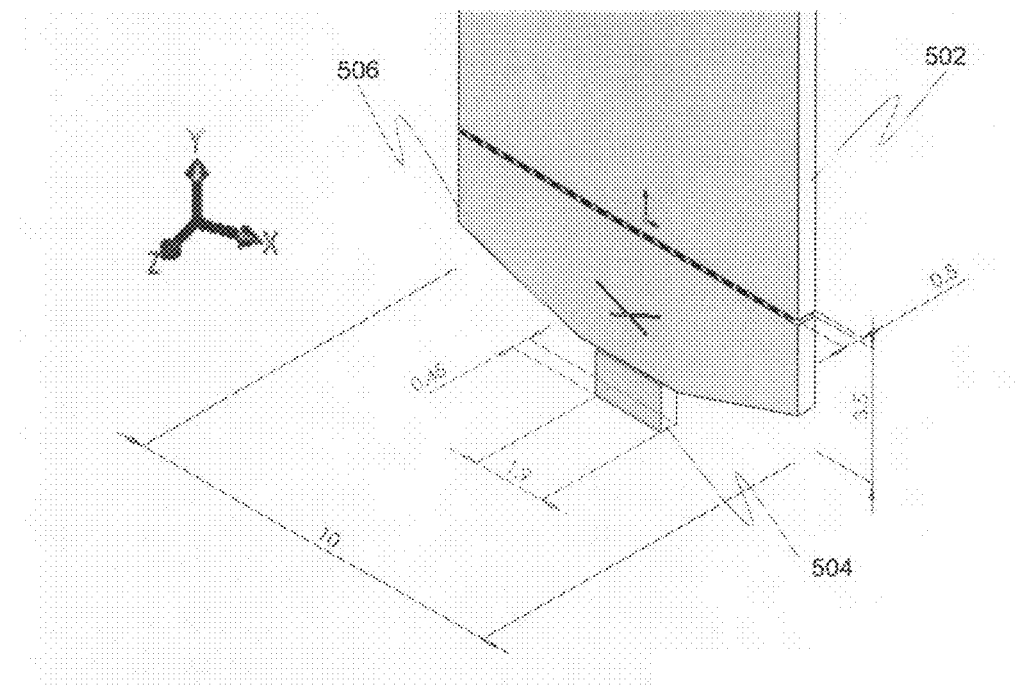
FIG. 5 illustrates the embodiment of FIG. 4a with a perspective effect and exemplary dimensions.

FIG. 5 further illustrates the embodiment of FIG. 4a and also visualizes, by way of example only, applicable dimensions that are given in mm. A light source, such as a white LED 504, has in this particular example a rectangular shape with dimensions 1.9 mm×0.45 mm. Light emitted by the LED propagates into the incoupling structure 506 with dimensions 10 mm×3.5 mm through its predetermined input side surface that is shorter than the predetermined output side. A thickness of the incoupling structure for efficient energy transmittance may be selected such that it is higher or equal than the thickness of the LED 504 and less or equal than thickness of the lightguide 502; thickness may thus be chosen to be equal to the thickness of the lightguide 502, i.e. 0.5 mm, for example. LED 504 may be located centered relative to the input side of the structure 506. On the opposite, exit side a surface relief structure parallel to x axis is configured to perform collimation of the coupled light relative to the yz plane, i.e. minimize the x component of rays and, thus, the maximum angle of light angular divergence to axis y in plane xy, and refract the rays to propagate in plane yz. Then, the collimated, more uniform light will enter the lightguide 502 having 10 mm width, 40 mm length, and 0.5 mm thickness, for example. A distance from the LED to the incoupling structure may be 0.1 mm, for example. The LED 504, the incoupling structure 506, and the lightguide 502 may be covered by two reflector films with e.g. about 99% reflectivity to minimize light leakage in the contact areas.

Figure 6A:
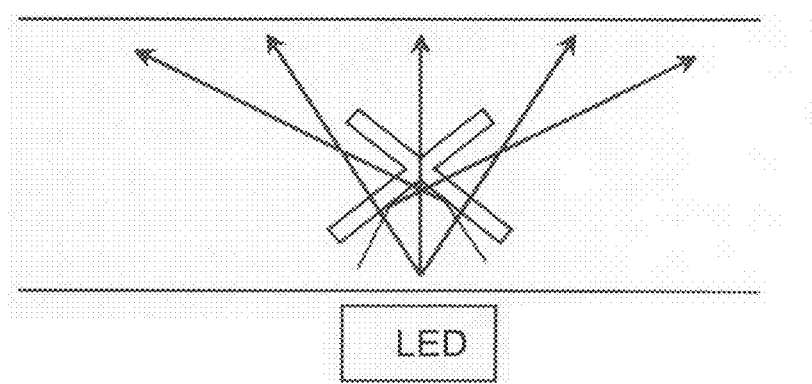
FIG. 6a illustrates a plan view of an embodiment of LED positioning relative to the lightguide and resulting light propagation therein.
Figure 6B:
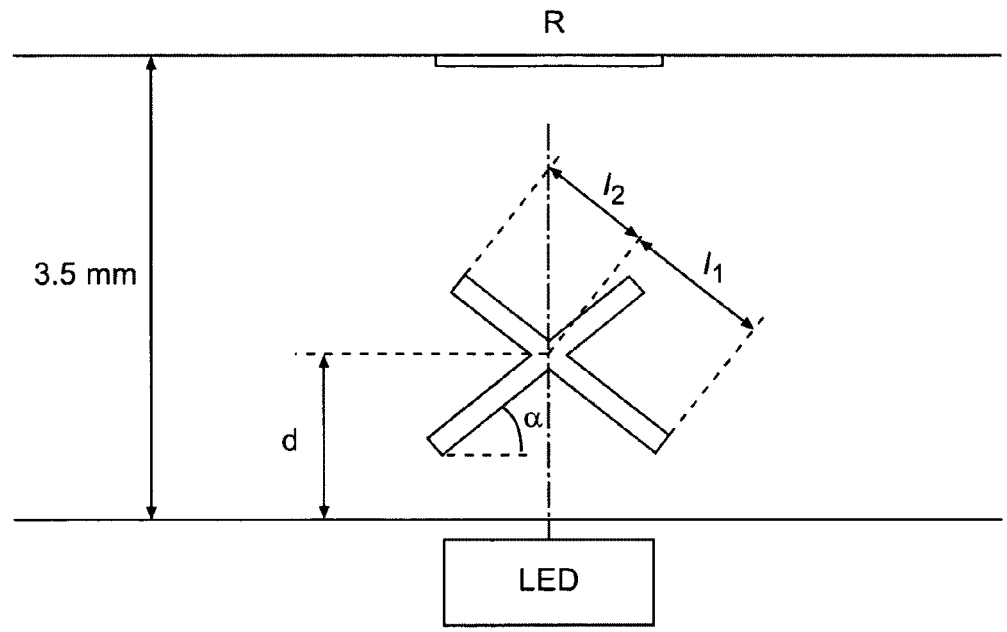
FIG. 6b illustrates design parameters for arranging hole(s) in the incoupling structure.

Inclination of the hole (components) may be designed using the following conditions. Deposition of the hole may be symmetrical with respect to the LED's axis of symmetry. The hole itself may be located such that its edges deflect light from center region to side regions thereof. The geometry shown in FIG. 6a may be chosen as a reference. There may be rays undergoing total internal reflection from the hole boundary. These rays may be redirected out of the center region of the medium of the incoupling structure. The design of the hole can be described using the following parameters in the case of substantially 'x'-shaped holes. With reference to FIG. 6b, distance from the center of the hole to input side of the incoupling structure is marked with d, inclination angle with α, and lengths of the hole constituent lines from the center with l1 and l2. In the illustrated example the length of the incoupling structure is 3.5 mm.

In the exemplary configuration, the inclination angle α was considered to preferably remain smaller than a predetermined limit of about 32° to substantially avoid light reflections back to the LED. Holes with certain angle of inclination may advantageously limit light passing to center region to the average value of luminance on the predetermined output surface such as the surface facing the input surface on the opposite end of the incoupling structure.

Figure 6C:
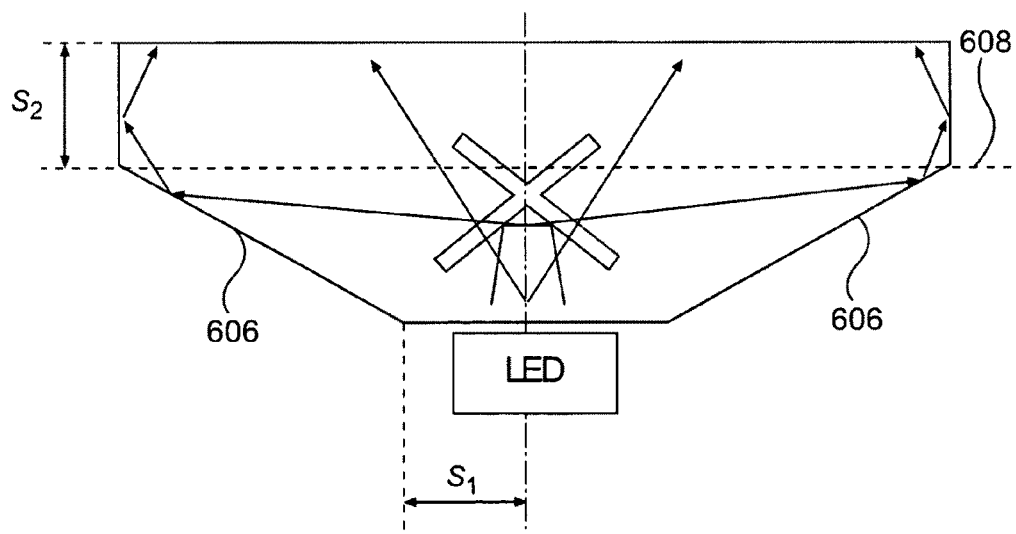
FIG. 6c illustrates one embodiment of a medium shape for an incoupling structure in accordance with the present invention.

It was then discovered that for α=20° luminance of region R (about +/−1 mm from the axis of symmetry) may be equal to average. Implementation of such geometry implies that the shape of the incoupling medium may be modified and further enhanced from a basic rectangular one to the one illustrated in FIG. 6c so as to avoid light losses through the sides of the incoupling structure. Slanted sides 606 next to the input side facing the LED now more effectively reflect light initially deflected by the hole(s), substantially towards desired exit direction, i.e. the exit side opposite to the input side of the medium, and the leakage through the sides 606 is lessened. The obtained cross-sectional shape of the incoupling structure can be thus considered as a combination of two adjacent, substantially seamlessly integrated elements: an isosceles trapezoid co-operating with the LED and a rectangle facing the target entity such as a lightguide, the fictitious border between these two elements being illustrated via a broken line 608 in the FIG. 6c.

Figure 6D:
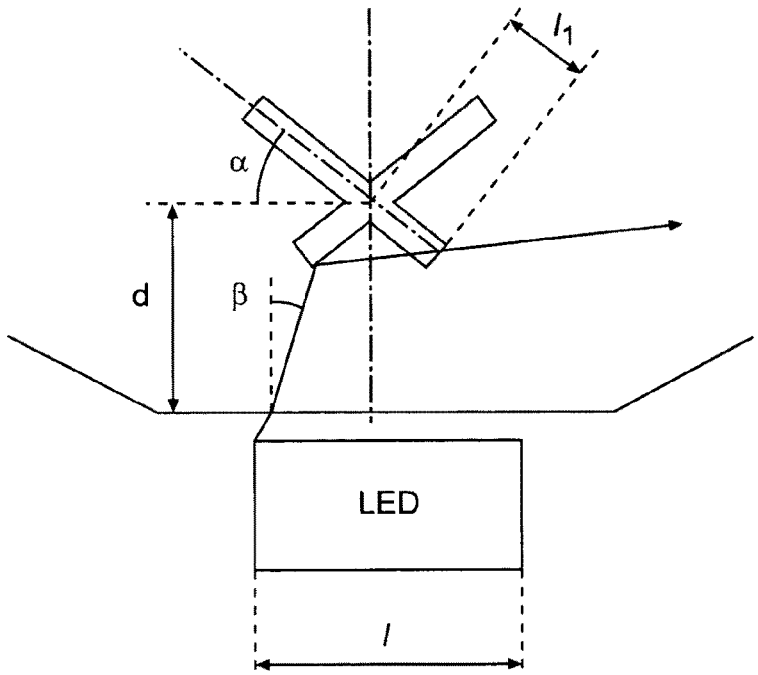
FIG. 6d illustrates an example of light propagation in the embodiment of FIG. 6c.

One option for determining the length of the line l1 is presented next. In the illustrated case, for inclination angle α=20° all rays with angles β less than 22° in relation to the vertical axis of symmetry are redirected by the boundary between the hole and the incoupling medium, see FIG. 6d. Consider the ray propagating from a corner of the LED to the collimation structure at an angle under 34° relative to the normal of the incoupling structure surface. Then, the ray refracts into the structure at an angle under 22° to the normal. This ray is preferably redirected by the hole. Therefore, the following condition shall be fulfilled $$l_1 = \frac{l/2 - d\tan\beta}{\cos\alpha - \sin\alpha\tan\beta}, \quad (1)$$

where l is the length of the LED as shown. Parameters to be optimized in this example are the distance from the input side of the structure d, line length l2 (see FIG. 6b), distances s1 and s2 (see FIG. 6c). Opposite side, i.e. exit side, of the incoupling structure was in this calculation assumed to be absorptive. Optimization of the parameters was conducted for the incoupling structure in order to maximize the portion of absorbed energy E and uniformity U of energy on the exit side. Intensity uniformity on the exit side of the incoupling structure was calculated using the following relation:

$$\text{Uniformity} = 1 - \frac{\sum_N |I_j - \bar{I}|}{N\bar{I}}, \text{ where } \bar{I} = \frac{1}{N}\sum_N I_j, j = 1, \ldots, N. \quad (2)$$

wherein $I_j$—intensity of light in the point j, and j—variety of the points on the front surface of the waveguide, N—total number of the points of measurement;
Ī—mean value of the intensity.

It was found that e.g. parameter values l2≈0.9 mm, d≈1.25 mm, s1≈1.5 mm, and s2≈2.35 mm provide high energy and uniformity values on the exit area of the incoupling structure. Parameter l1≈0.55 mm was determined considering the substantially 0.1 mm air gap between the LED and the incoupling structure. The following experiments demonstrate the maximum value of the uniformity with high percentage of energy.

In the exemplary configuration, changing l2 from 0.9 mm value may result in decrease of the uniformity as shown in Table 1:

TABLE 1

| l2, mm | d, mm | s1, mm | s2, mm | Energy, % | Uniformity, a.u. |
|---|---|---|---|---|---|
| 0.8 | 2.25 | 1.5 | 2.35 | 84.11 | 87.66 |
| 0.9 | 2.25 | 1.5 | 2.35 | 84.15 | 87.81 |
| 1.0 | 2.25 | 1.5 | 2.35 | 83.91 | 86.59 |

Correspondingly, changing d from the value 2.25 mm may result in decrease of the uniformity as shown in Table 2:

TABLE 2

| l2, mm | d, mm | s1, mm | s2, mm | Energy, % | Uniformity, a.u. |
|---|---|---|---|---|---|
| 0.8 | 2.15 | 1.5 | 2.35 | 84.11 | 87.66 |
| 0.9 | 2.25 | 1.5 | 2.35 | 84.15 | 87.81 |
| 1.0 | 2.35 | 1.5 | 2.35 | 83.91 | 86.59 |

Further, changing $s_1$ from the 1.5 mm value may result in decrease of the uniformity as shown in Table 3:

TABLE 3

| l2, mm | d, mm | $s_1$, mm | $s_2$, mm | Energy, % | Uniformity, a.u. |
|---|---|---|---|---|---|
| 0.8 | 1.25 | 1.4 | 2.35 | 84.19 | 87.36 |
| 0.9 | 1.25 | 1.5 | 2.35 | 84.15 | 87.81 |
| 1.0 | 1.25 | 1.6 | 2.35 | 84.01 | 87.62 |

Yet, changing $s_2$ from the 2.35 mm value may result in decrease of the uniformity as shown in Table 4:

TABLE 4

| l2, mm | d, mm | s1, mm | s2, mm | Energy, % | Uniformity, a.u. |
|---|---|---|---|---|---|
| 0.8 | 1.25 | 1.5 | 2.25 | 84.03 | 87.70 |
| 0.9 | 1.25 | 1.5 | 2.35 | 84.15 | 87.81 |
| 1.0 | 1.25 | 1.5 | 2.45 | 83.91 | 85.59 |

Accordingly, the experiments indicate that the parameters of the collimation structure work well for the given geometry.

Figure 6E:
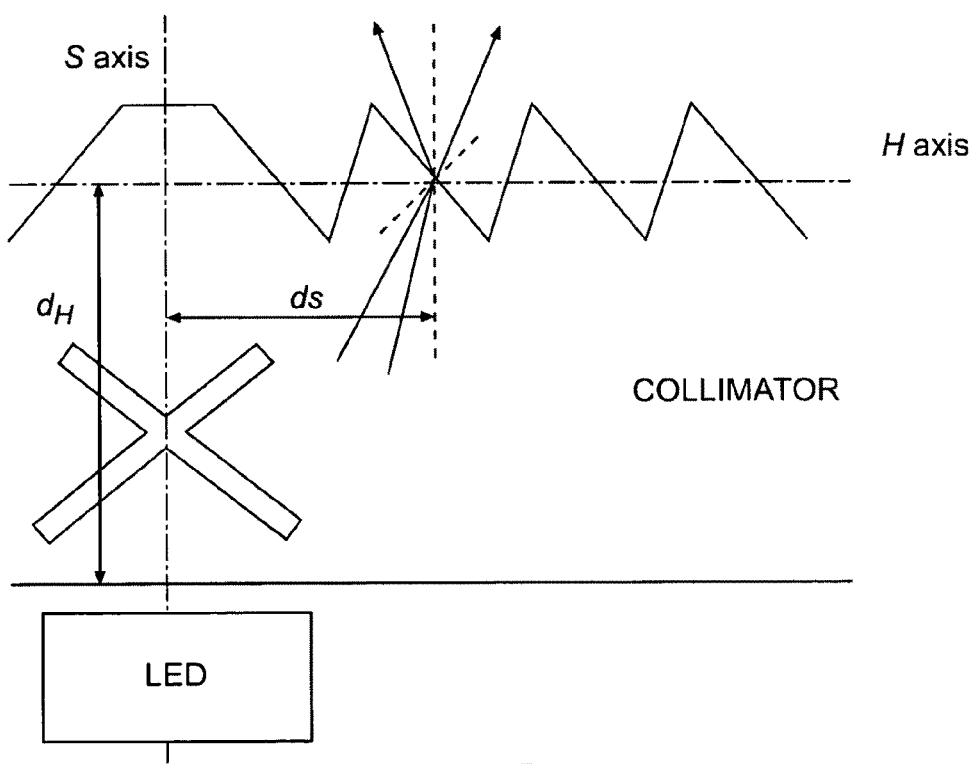
FIG. 6e illustrates one embodiment of surface relief pattern design on the output surface of the incoupling structure in accordance with the present invention.
Figure 6F:
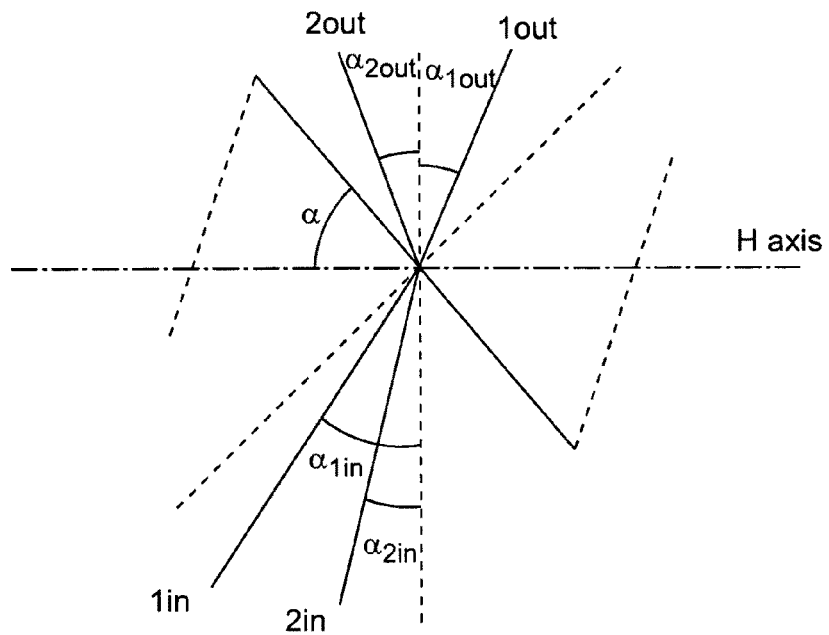
FIG. 6f illustrates incident and outcoupling angles associated with the scenario of FIG. 6e in more detail.

Curvature of the surface of the surface relief structure may be designed using the following conditions, for example. See FIG. 6e for illustration. Axis H is located at a distance dH from the frontal, input side of the incoupling structure facing the LED and is directed parallel to the input side. In the modeling study the distance dH was assumed to be about 3.5 mm. Axis of symmetry S goes through the center of the LED and is directed perpendicular to the frontal side of the incoupling structure. Angles α1in and α2in of light angular distribution are determined for a certain point on axis H, see the sketch of FIG. 6f. Angle α of the microstructure surface inclination in the point located on the distance ds from the axis S may be used to determine angles of the refracted rays α1out and α2out. Refracted rays α1out and α2out may be minimized as a design goal.

Figure 6G:
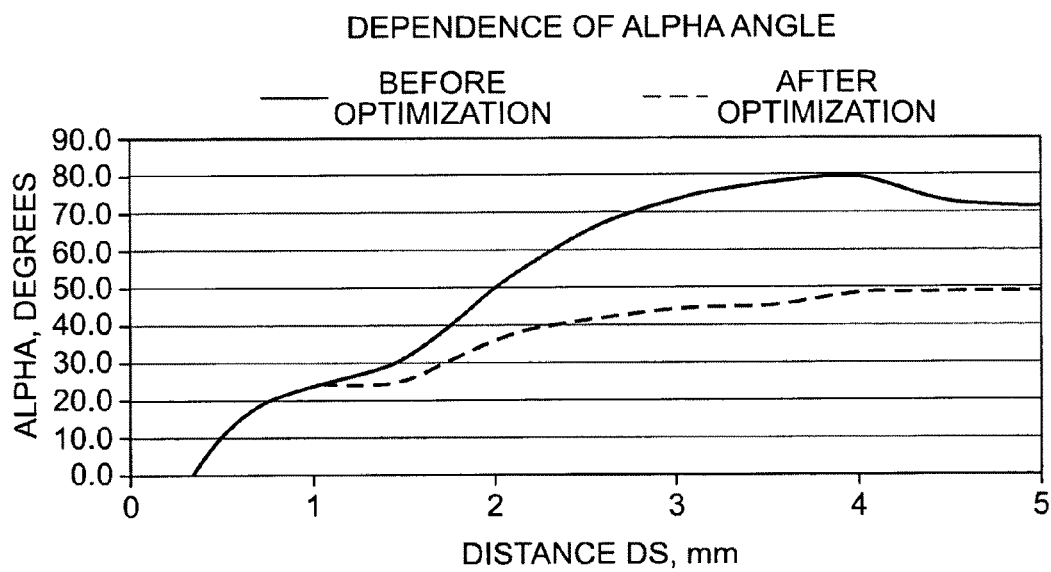
FIG. 6g illustrates dependency between relief inclination angle and distance to the axis of symmetry of the arrangement.
Figure 6H:
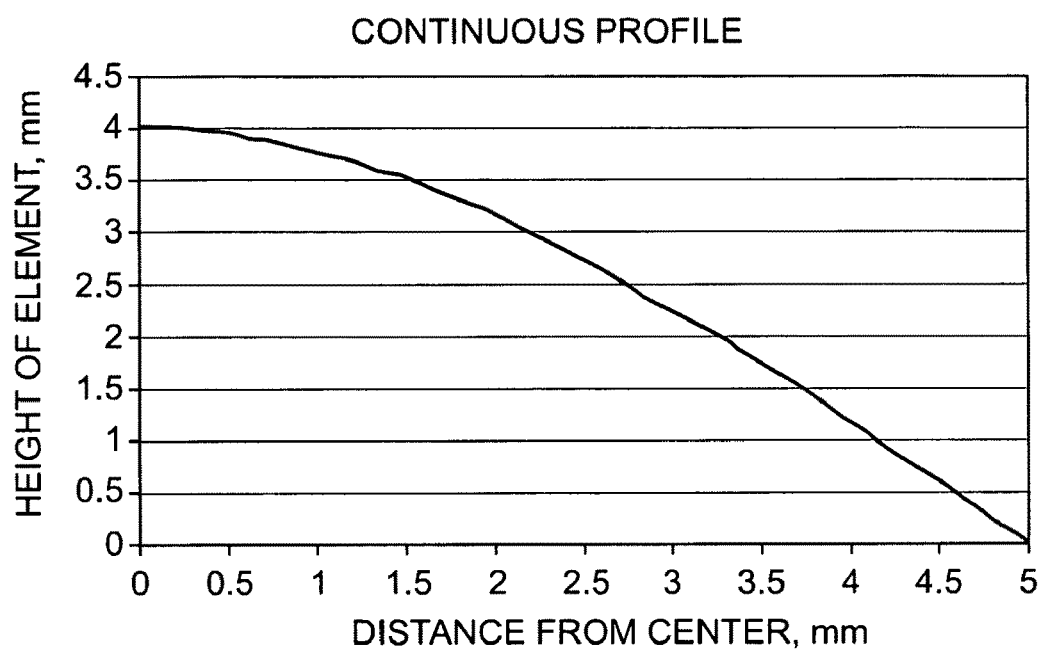
FIG. 6h is a graph illustrating one embodiment of the height of an initial surface relief structure.

The α inclination angle may be chosen by the condition of equality of angles of refracted rays α1out and α2out. The calculated dependence of relief inclination angle α on a point of the H axis at a distance ds to the axis of symmetry S is shown in FIG. 6g. The solid line represents the obtained dependence based on actual intensity angular distribution. The dotted line represents optimized dependence based on maximizing the transmitted energy. Using this dependency an initial continuous relief could be developed. Due to the symmetric geometry in relation to S axis, representing only half of the dependency between the relief height and distance is considered as sufficient in FIG. 6h.

The height and feature sizes of the collimating microstructure may preferably be selected higher than the wavelength of e.g. red light in order to avoid undesired diffraction effects and color dispersion of the light emitted by a white LED.

Figure 6I:
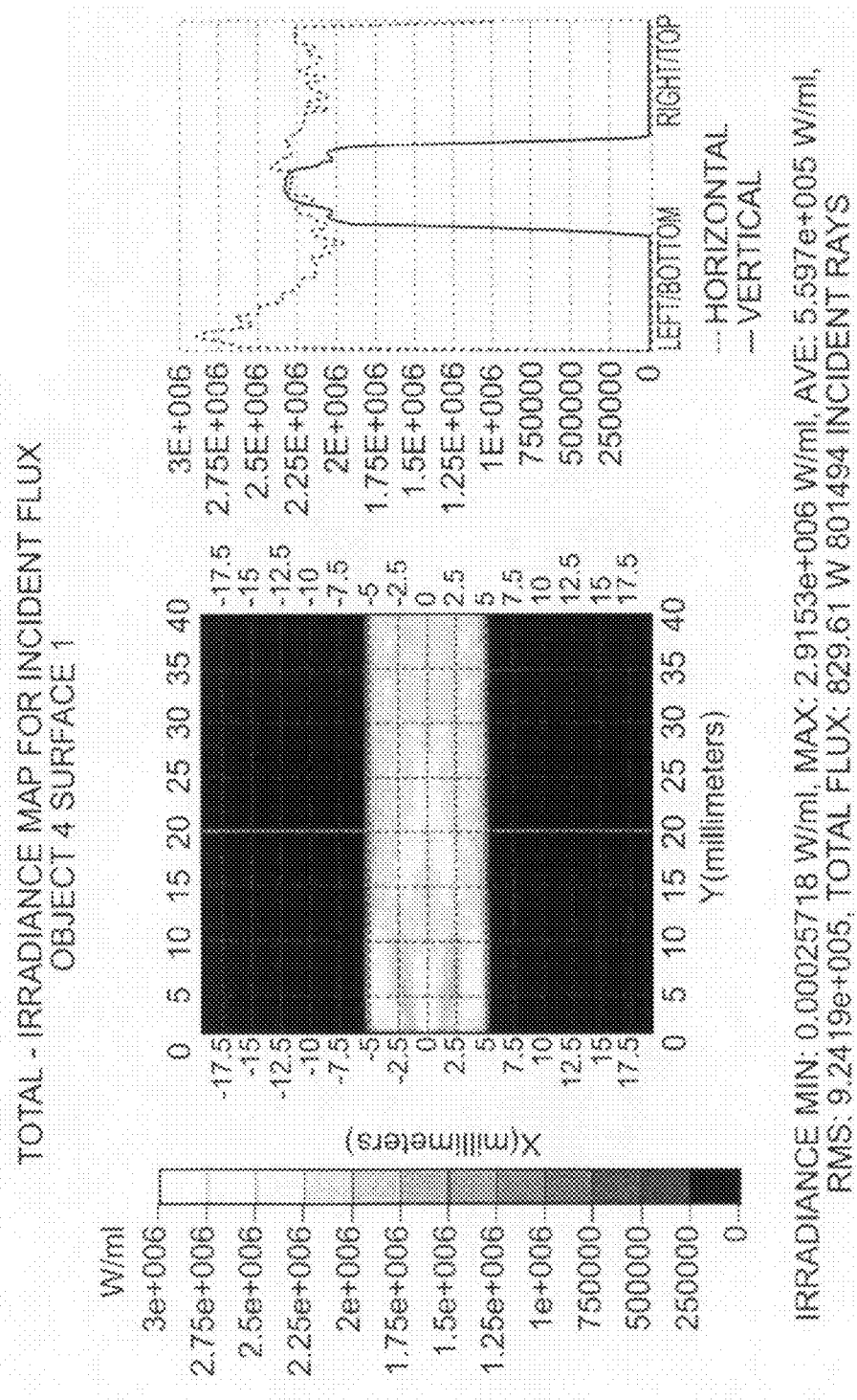
FIG. 6i illustrates an example of an achievable intensity distribution over a target lightguide.

Resulting intensity distribution on the surface of the destination waveguide is illustrated in FIG. 6i. Uniformity of the intensity distribution over the lightguide was found to be over 93%. Uniformity of the intensity distribution over the frontal side of the lightguide at 3.5 mm far from the LED was about 84% (not shown). Uniformity of the intensity distribution over the frontal side of the lightguide at 5 mm far from the LED was about 86% (not shown). Uniformity is therefore generally advantageously high. However, increasing the uniformity may result in a higher angular divergence of the transmitted energy and slightly decreased incoupling efficiency. As a conclusion, application of the suggested holes is an efficient way to increase uniformity in backlights having less stringent requirements on intensity angular distribution.

In the embodiment of FIG. 7a, the incoupling structure is designed for three, i.e. multiple, light sources, such as LEDs, so as to redirect portion of propagating light towards the sides of the structure via the embedded holes. The light undergoing total internal reflection on the sides of the structure is then redirected towards predetermined output side by proper selection of the medium shape. A certain portion of light may again propagate to the exit side of the structure substantially straight through the holes. The exit side in this embodiment has a cylindrical microrelief surface structure to collimate the output light. The shape of the incoupling structure optimized in accordance with the principles set forth in the description of previous embodiments was taken as a starting point for the optimization procedure.

As the structure is symmetrical, only half of the initial shape was prepared for optimization by dividing it into segments as shown in FIG. 7b. The length of the incoupling structure h equals to about 3.5 mm in this example.

Each segment may be characterized by the angle of inclination $\alpha_k$ and length $l_k$ (see FIG. 7c).

An optimization procedure may be based on maximizing the uniformity of luminance on side H of the incoupling structure and minimizing the maximum angle of light angular divergence to axis y in plane xy. During initial optimization, side H was assumed to be perfect absorber. Intensity uniformity over the opposite, exit side of the incoupling structure was calculated using the previously presented uniformity equation, whereby the following dimensions and inclination values for different segments were obtained:

TABLE 5

| # of segment | length, mm | Inclination, degrees |
|---|---|---|
| 1 | 0.65 | 0 |
| 2 | 0.68 | 15 |
| 3 | 1.1 | 21 |
| 4 | 1.03 | 23.5 |
| 5 | 1.24 | 30 |

The optimized shape (darker line) of a medium edge for multiple light sources is shown in FIG. 7d in comparison with the initial shape (lighter). The table below includes the information on FWHM on side H, uniformity U over the side H, incoupling efficiency E (energy transmitted to side H) for new optimized structure and old initial structure.

TABLE 6

|  | Optimized shape | Initial shape |
|---|---|---|
| FWHM | 80.4° (+/−40.2°) | 85° (+/−42.5°) |
| U | 87.57% | 87.81% |
| E | 85.85% | 84.15% |

The performed optimization reduced the angular divergence of light transferred to side H by 4.6°. Also, incoupling efficiency was increased by 1.7%. However, the uniformity of light energy was decreased to a minor extent.

Considering the design of the surface relief structure, FWHM angles of intensity angular distribution on axis H in the structure dependence on distance ds from axis S was estimated by numerical experiments. Optimization of the structure shifted the angular divergence to axis of symmetry from about 3.7 mm to about 5 mm distance by 5° to 10°. However, for distances from about 2.3 mm to about 3.7 mm angles of FWHM are still not as small as they could for certain applications. It is thus suggested that the angles in this region are reduced by using additional holes.

The $\alpha$ inclination angle is chosen by the condition of equality of angles of refracted rays $\alpha 1out$ and $\alpha 2out$. The calculated dependence of relief inclination angle $\alpha$ in a point on the H axis at distance ds to the axis of symmetry S is calculated for initial and optimized structure and shown in FIG. 7e. Relief inclination of the optimized structure is less with distances from about 0.25 mm to about 1.25 mm and from about 3.7 mm to about 5 mm than in the initial structure.

Large angles between the normal of the microstructure relief and incident beam reduce the transmitted energy. So, it is generally advantageous to decrease the relief inclination angle. Three corrected dependencies with small, intermediate, and large decrease in the relief inclination angle (correction 1, correction 2, correction 3) were also tested in experiments. The corrected dependencies of relief inclination are shown in FIG. 7f.

A continuous profile was constructed using the corrected dependencies. One half of the associated symmetric graph is shown in FIG. 7g. A discretized profile of a microstructure may be then developed using this analysis data.

FIG. 8 illustrates one further embodiment of an incoupling structure wherein two prisms 806, 808 are utilized. Both prisms 806, 808 in this embodiment are configured to spread the incoming light to increase uniformity thereof in the target entity, such as a lightguide 802. Additional triangle-shaped prism 808 is in this embodiment thus arranged at the center of the structure. Axis of symmetry is located at the center of the LED and directed perpendicular to the frontal side of the structure 806 having a shape of a truncated triangle. Initial structure 806 also has a symmetric continuous relief. A smaller prism element 808 at the center of the structure can be used to distribute light even more efficiently from the center region to the sides.

FIG. 9 illustrates a scenario in which light is coupled from a LED 904 with a body of size e.g. about 0.96 mm×0.96 mm into a lightguide 902 e.g. about 3-8 mm thick, with refractive index in the approximate range n=1.29-1.68. An optimization procedure for the incoupling structure to couple light into a thicker lightguide, e.g. thicker than about 1 mm (n=1.5), may basically be the same as that for a similar element in connection with a thin lightguide. One difference may be a smaller number of multiple reflections from the surface relief microstructure, which results in a higher efficiency.

A surface relief microstructure may be applied to both walls of the lightguide that are facing the LED. The bottom side may be coated with a refractive microrelief, whereas the upper side may be coated with a reflective microrelief in the form of a triangular grating.

The figure schematically shows the geometry of rays, with the top-side reflection grating additionally enabling the coupling of the portion of the zero-order energy in its central region (the orders −1' and 1'). The obtained incoupling efficiency may still be increased in contrast to a mere single-surface microstructure.

FIG. 10a illustrates a cross-section of one further embodiment of the present invention wherein a cone-shaped hole 1006 is formed in the incoupling structure (medium) or directly in the lightguide 1002. The lightguide 1002 having a thickness H includes a cone-shaped hole of apex angle $\theta$, depth h, and diameter D. The refractive index of the lightguide 1002 is n. The hole may be filled with air or some other gas, or with a solid medium having a predetermined refractive index different from the one of the surrounding lightguide medium 1002. The apex angle $\theta$ may be about 20°, 30°, 40°, or 50°, for example. A preferred hole diameter depends on the irradiation body size and is chosen in this embodiment to be about D=1.6 mm.

Table 7 gives exemplary results of computation and simulation of the cone hole 1006 with regard for the various refractive indices of the lightguide. The value of $\eta$ is the coupling efficiency given as a percentage of the total LED energy. The LED directivity diagram is considered to be Lambertian. The lightguide thickness shall not be less than the cone height h. In the Table: n designed=the designed refractive index enabling an optimal operation of the scheme, n used=the refractive index for which the value of $\eta$ was computed.

TABLE 7

The parameters of the waveguide hole vs the refractive index.

| n designed | n used | h, mm | $\theta$, ° | $\eta$, % |
|---|---|---|---|---|
| 1.5 | 1.5 | 7.7 | 12 | 99.5 |
|  | 1.4 |  |  | 86.5 |
|  | 1.29 |  |  | 63.9 |
| 1.6 | 1.6 | 3.94 | 23 | 99.55 |
|  | 1.5 |  |  | 94.3 |
|  | 1.4 |  |  | 79.2 |
|  | 1.29 |  |  | 59.5 |
| 1.68 | 1.68 | 2.7 | 33 | 99.0 |
|  | 1.6 |  |  | 96.8 |
|  | 1.5 |  |  | 86.12 |
|  | 1.4 |  |  | 71.5 |
|  | 1.29 |  |  | 52.7 |

For the refractive index equal to or less than n=1.41, the coupling efficiency typically decreases considerably. 100% efficiency will remain practically unattainable because some limited portion of light leaves the lightguide through its top. Table 7 gives the hole depth h, with the calculation results being valid for lightguide thickness H>h.

FIG. 10b illustrates an embodiment of the present invention, wherein two substantially cone-cone shaped optical elements are used for (in)coupling purposes. The performance of the embodiment of FIG. 10a may in certain occasions be enhanced by adding a second, 180° flipped cone, a 'top cone' 1008, at the input region. The apex of the top cone 1008 may be facing the apex of the lower cone, and in extreme case the apexes may limit to each other. The dimensions of the top cone 1008 may be selected application-wise.

In one configuration the achieved performance was as follows:

TABLE 8

| n | η, % |
|---|---|
| 1.29 | 75.2 |
| 1.4 | 94.5 |
| 1.5 | 98.6 |
| 1.6 | 98.4 |
| 1.68 | 98.04 |

Applying a mirror (reflective) coating to the top cone modifies the results as follows:

TABLE 9

| n | η, % |
|---|---|
| 1.29 | 86.8 |
| 1.4 | 96.2 |
| 1.5 | 98.59 |
| 1.6 | 98.4 |
| 1.68 | 98.04 |

When the goal is to couple light into a lightguide with a wide range of refractive indices, the above arrangement performs quite well in the entire range of the refractive indices. For the refractive index of n=1.29 (the lightguide being about 3 mm thick) it is, by a further optimized cone, possible to get a coupling efficiency of about 83%, whereas the application of the mirror coating on the top cone may increase the efficiency up to about 98%. For a thicker lightguide, even better results may be obtainable. Table 10 provides an insight in terms of coupling efficiency and refractive index into the analysis results for a lightguide with thickness 8 mm for the same optical configuration.

TABLE 10

| n | η, % |
|---|---|
| 1.29 | 98.14 |
| 1.4 | 99.6 |
| 1.5 | 99.4 |
| 1.6 | 99.3 |
| 1.68 | 99.1 |

The two-cone scheme as illustrated may be optimized case-specifically based on the assumption that the at least few of the following parameters are known: the lightguide thickness; the lightguide refractive index; size of the light source, e.g. LED, irradiation body, and (in)accuracy in the light source alignment in the XZ-plane and on the Y-axis.

If the cone is to be manufactured by drilling a blind hole to the lightguide, the smoothness of the cone surface should be considered, since wall roughness on the Y-axis (ring-like grooves due to low-quality drilling) may cause the radiation to leave the lightguide through its top when the scheme operates at designed refractive index and height h. Minor roughness on the cone surface found in the XZ-plane (with the grooves parallel to the cone axis) is possibly not that critical.

In both schemes, the LED irradiation body is preferably placed right against the lightguide (bottom) side. When manufacturing the arrangement, one option is to slightly sink the LED into the cone. This may increase the coupling efficiency (e.g. by about 0.1 . . . 0.2%) and preclude the possibility of seeing the LED at the acute angle to the lightguide outside surface. The depth of the LED embedding may be determined case-specifically.

FIG. 11a illustrates a cross-section of another embodiment of a refractive cone-aided incoupling structure for conveying light into a (thin) waveguide. It may be considered e.g. a scheme for coupling light from a light source such as LED 1104 into a lightguide 1102 that may be only about 0.15 mm thick, the refractive index being about n=1.5. The cone 1106 defined by the hole may substantially be a truncated, e.g. circular, cone such as a frustum, and obtained by drilling through the lightguide 1102, or by utilizing a suitable mold, for example.

Also in this embodiment, the incoupling structure 1112 may be installed by a drilling a hole to the lightguide, and in this case through the lightguide, resulting either directly slanted walls or walls perpendicular to the lightguide surface. In the latter case a lighting element, such as a incoupling module 1112 including a medium material, either similar to or different from the surrounding lightguide medium 1102, defining the truncated-cone shaped hole 1106 filled with air or some other medium, and optionally provided with a light source such as LED, is arranged to the hole.

For the scheme shown in the figure the coupling efficiency may be about 61% for a lightguide with refractive index of about n=1.5. Together with refractive index the efficiency will rise, whereas a decrease in the index may cause the efficiency to fall. Thus, for n=1.68 the coupling efficiency may be about 67%.

FIG. 11b illustrates another embodiment of an incoupling structure including a shape of a truncated cone. In this embodiment more thickness is locally added to the lightguide medium 1102 around the incoupling structure 1106 such that the incoupling structure is enhanced via additional coupling surface, local medium depth, and resulting improved angles. The incoupling structure may be provided as a lighting element, such as a module 1114 incorporating gradually thickening medium portions 1108, cone material (if any) 1106, and/or light source such as LED 1104. By analysis, for n=1.68 the coupling efficiency of about 72% may be reached, for example.

The coupling efficiency may in certain applications be further increased by introducing a reflective cone into the scheme under study. One further embodiment of an incoupling structure in accordance with the present invention is thus illustrated in FIG. 11c. A reflective coating 1118, pointed by the arrows in the figure, is provided as shown such that the contour line of the cross-section of the hole (bottom) substantially defines an 'm' letter. The incoupling structure may be again provided as a lighting element such as a module 1116. The 'm'-shape may be obtained by carving such shape into the medium or by first drilling a through hole and subsequently arranging the triangle 1120 (composite (e.g. reflective+medium material) or fully manufactured from the selected reflective material) so as to convert the through hole into a blind hole with 'm' profile. The hole may be filled with air or some other preferred gas, or by feasible solid, elastic or even gel or liquid material as stated hereinbefore depending on the desired refractive index and other properties thereof. Further, e.g. phosphor may be used in the case of blue chip vs. white light illumination applications, for example.

In the embodiments of FIGS. 11a, 11b, and 11c, the geometric parameters of the cone may be calculated and/or experimentally optimized for the highest coupling efficiency in an application-specific manner. The embodiments with truncated cones without reflectors are especially suitable for occasions in which portion of light may actually preferably pass directly through the lightguide via the apex hole.

FIG. 11d represents dimensions of one possible implementation of the incoupling structure in accordance with the embodiment of FIG. 11c. The measures are given in mm and the angles in degrees.

FIG. 12a illustrates a surface view 1210 and a cross-sectional view 1220 of a further embodiment of the present invention wherein a so-called azimuth grating is combined with a cone-shaped central portion so as to provide enhanced light incoupling structure. The binary diffraction grating or other preferred grating structure includes piecewise-parallel grooves 1208 symmetrically, e.g. radially located around a hole 1206 having a shape of a cone or a truncated cone as described hereinbefore, in the medium. With a grating solution the incoupling efficiency is typically insufficient at all incident angles; thus a hybrid solution may be provided with improved incoupling efficiency. In the case of substantially point-like light source, e.g. a LED, the cone 1206 may be a right circular cone positioned such that the vertical axis of the cone and the LED are joined, note the broken line in the figure. The grating may be configured to incouple rays emitted by the LED 1204 that miss the cone 1206, for example. When the distance between the LED 1204 and lightguide/cone 1206 increases, more and more light will first hit the grating 1208 instead of the cone 1206, but the incoupling efficiency still stays higher than with a mere cone-type incoupling arrangement. Thus, the embodiment is especially suitable for applications in which the LED cannot be seamlessly integrated with, or even deposited slightly within, the lightguide surface. FIG. 12a illustrates one zone of piecewise-parallel grooves around the hole 1206, but also additional zones further away may be added to solution with different, e.g. zone-specific, parameters such as grating period and/or groove height.

FIG. 12b illustrates an alternative azimuthal grating 1212 to be used with a cone-type hole (not shown). In this embodiment a grating zone includes radially diverging, widening grooves. Therefore, also the grating period T is altered as a function of R and/or x, i.e. the distance of a zone start and/or within-zone position from the overall symmetry center, for example. In this example, the hole 1214 may be have a cross-sectional shape of letter 'm' as explained hereinbefore or some other shape, for example.

Generally the use of a laser instead of e.g. a LED as a light source may increase the coupling efficiency because laser light is inherently collimated; thus it can be focused into a small region comparable with the thickness of the lightguide, and then coupled into the lightguide using micro-optics. The coupling efficiency may be improved by reducing the input region (and, hence, the size of the light source) and/or increasing the lightguide thickness.

FIG. 12c illustrates a top view of a further embodiment of an azimuthally symmetric binary diffraction grating suitable for use with a cone-type center element in a lightguide for incoupling purposes. The grating grooves are in this embodiment continuous over the whole structure, i.e. there are no separate zones.

FIG. 13a illustrates an embodiment of an incoupling structure wherein multiple light sources, such as LEDs, are used to form a predetermined color combination, such as white light. In order to mix the light from the multiple LEDs effectively prior to entering the lightguide a cylinder 1306 whereto the LEDs (each emitting e.g. red, green, or blue light with associated wavelengths/refractive indexes such as 617 nm (n=1.4901), 525 nm (n=1.49473), and 469 nm (n=1.497), respectively) are installed to a predetermined depth S such that the resulting several couplings by the diffusing/reflective inner walls of the cylinder 1306 mix the rays already on the way to the actual lightguide. Thus, the arrangement is suitable for white balance adjustment and color mixing, for example, and it may be co-implemented with other incoupling structures, such as a (truncated) cone-type tapered hole presented hereinbefore. Also, an increase in the waveguide thickness may lead to a further increase in the coupling efficiency. Generally, considering the effect of distance S from the waveguide plane, the larger the distance S, typically the better is the uniformity measured at the lightguide.

FIG. 13b visualizes another embodiment of a cylindrical incoupling structure in accordance with the present invention. The light source(s), such as LED(s) (e.g. multicolor multichip), have been placed deeper in the cylinder such that more reflections occur in the cylinder while the rays propagate towards the waveguide, which preferably enhances the color mixing effect.

FIG. 14 specifically illustrates an embodiment of the present invention wherein a lighting element 1402 includes a light source, such as a LED chip, and integrated optics in accordance with the principles set forth hereinbefore. The optics may include aforementioned structures, such as a blind or through hole, for example. Further, reflective layers, certain shapes such as the cross-sectional 'm' shape 1404, grating structure, or various other surface relief forms may be included in the optics. The FIG. 14 thus shows only one example of such integrated element.

The various embodiments of the present invention may be adapted and combined as desired as being appreciated by persons skilled in the art. For example, the incoupling structure may be tailored for use with various lighting products, such as displays, lamps, handheld products, such as mobile terminals, wrist computers, PDAs, watches, vehicle lighting, etc. Accordingly, the incoupling structure may be constructed as multi-purpose version and then integrated with a further, application-specific optically functional layer, e.g. a keymat of a keypad assembly.

The scope of the invention is determined by the attached claims together with the equivalents thereof. The skilled persons will again appreciate the fact that the explicitly disclosed embodiments were constructed for illustrative purposes only, and the scope will cover further embodiments, embodiment combinations and equivalents that better suit each particular use case of the invention.

The invention claimed is:

1. A light incoupling structure for lighting applications, comprising:
    an optically substantially transparent medium for transporting light emitted by a light source;
    a first optical element arranged in the medium, wherein said first optical element comprises at least part of a first substantially cone-shaped or truncated cone-shaped blind or through hole in the medium;

wherein said first optical element is configured to redirect light via a boundary region between the medium and the hole into said medium to propagate therein, wherein said first optical element comprises a blind hole having a substantially 'm'-shaped cross-sectional form, and wherein at least part of a bottom surface of the blind hole is reflective.

2. The light incoupling structure according to claim 1, wherein the redirected light propagates by total internal reflection.

3. The light incoupling structure according to claim 1, said light incoupling structure further comprising:
 a second optical element comprises a second cone-shaped blind hole arranged on the opposite side of the medium relative to the first optical element.

4. The light incoupling structure according to claim 3, wherein an apex of the first optical element and an apex of the second optical element are configured to substantially face each other in the medium.

5. A light incoupling structure for lighting applications, comprising:
 an optically substantially transparent medium for transporting light emitted by a light source;
 a first optical element arranged in the medium, wherein said first optical element comprises at least part of a first substantially cone-shaped or truncated cone-shaped blind or through hole in the medium; and
 a gradually thickening portion to interface the first optical element of a predetermined thickness with a target medium of a different thickness,
 wherein said first optical element is configured to redirect light via a boundary region between the medium and the hole into said medium to propagate therein.

6. The light incoupling structure according to claim 5, wherein the target medium comprises a lightguide.

7. The light incoupling structure according to claim 5, wherein the redirected light propagates by total internal reflection.

8. The light incoupling structure according to claim 5, wherein said first optical element comprises a blind hole, said light incoupling structure further comprising:
 a second optical element comprises a second cone-shaped blind hole arranged on the opposite side of the medium relative to the first optical element.

9. The light incoupling structure according to claim 8, wherein an apex of the first optical element and an apex of the second optical element are configured to substantially face each other in the medium.

* * * * *